(12) United States Patent
Matsumoto et al.

(10) Patent No.: US 6,472,496 B2
(45) Date of Patent: Oct. 29, 2002

(54) PROCESS FOR PRODUCTION OF AROMATIC POLYCARBONATE RESIN AND MOLDED ARTICLE OF AROMATIC POLYCARBONATE RESIN

(75) Inventors: Kyosuke Matsumoto; Masasi Simonaru; Toru Sawaki; Katsushi Sasaki; Masahiro Murakami; Yoshiki Matsuoka, all of Yamaguchi (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/840,144

(22) Filed: Apr. 24, 2001

(65) Prior Publication Data

US 2002/0032299 A1 Mar. 14, 2002

Related U.S. Application Data

(63) Continuation-in-part of application No. 09/418,553, filed on Oct. 14, 1999, now abandoned.

(30) Foreign Application Priority Data

Oct. 19, 1998 (JP) .......................................... 10-296633
Oct. 27, 1998 (JP) .......................................... 10-308407
Jan. 29, 1999 (JP) .......................................... 11-021693

(51) Int. Cl.[7] .............................................. C08G 64/00
(52) U.S. Cl. ...................................... 528/196; 528/198
(58) Field of Search ................................ 528/196, 198; 428/64, 119, 35.7

(56) References Cited

U.S. PATENT DOCUMENTS 5,502,153 A    3/1996   Sakashita
5,525,701 A    6/1996   Tominari et al.
5,912,318 A    6/1999   Hasegawa et al.

FOREIGN PATENT DOCUMENTS

EP    0 615 996 A1    9/1994
EP    0 992 522 A1    4/2000

*Primary Examiner*—Terressa M. Boykin
(74) *Attorney, Agent, or Firm*—Sughrue Mion, PLLC

(57) ABSTRACT

An aromatic polycarbonate resin is produced under the conditions that the flow velocity of the reaction mixture in a pipe through which a molten reaction mixture passes is a specific value or over, the viscosity-average molecular weight of the reaction mixture is 1,000 or more, the sum of the average retention times of the reaction mixture is not longer than 3 hours, the wall temperature of the pipe through which a molten reaction mixture passes is set to be higher than the temperature of the reaction mixture in the pipe, the catalyst deactivation agent is added within 2 hours after the completion of the melt polycondensation reaction, the filtration is carried out by using a filter having a specific retained particle size under a specific pressure difference, specific treated amount of the aromatic polycarbonate resin per unit area of the filter and a ratio of W (flow quantity of filtered polymer)×1,000/A (maximum area of the polymer path in the filtration vessel) falling within a specific range, etc.

41 Claims, 2 Drawing Sheets

PROCESS FOR PRODUCTION OF AROMATIC POLYCARBONATE RESIN AND MOLDED ARTICLE OF AROMATIC POLYCARBONATE RESIN

CROSS-REFERENCE TO RELATED APPLICATION

This application is a continuation-in-part of copending application U.S. Ser. No. 09/418,553 filed on Oct. 14, 1999 now abandoned.

BACKGROUND OF THE INVENTION

1. Field of the Invention

The invention of the present patent application relates to a process for the production of an aromatic polycarbonate resin required to have high quality such as a resin for optical use. The required high quality includes thermal stability, transparency, foreign matter content, etc., as well as color.

More particularly, the present invention relates to a process for the production of an aromatic polycarbonate resin mainly by melt polycondensation method and to a process capable of producing an aromatic polycarbonate resin having excellent color and transparency in high efficiency while keeping the color stability, thermal stability, etc., of the aromatic polycarbonate resin during the production process.

Further, the present invention relates to a process for the production of an aromatic polycarbonate resin having low foreign matter content, especially to a process for the production of an aromatic polycarbonate resin having low foreign matter content by using a polymer filter.

The collective improvement in the quality level of an aromatic polycarbonate resin on the color, thermal stability, transparency, foreign matter content, etc., is keenly demanded in the highly developed recent fields such as optical applications.

2. Description of the Related Art

Aromatic polycarbonate resin is widely known in general as an extremely useful resin owing to its excellent characteristics such as impact resistance and transparency. Aromatic polycarbonate resin can be produced by an interfacial method comprising the reaction of an aromatic dihydroxy compound (in the present-specification, "aromatic dihydroxy compound" is sometimes called as "aromatic diol compound") with phosgene in a mixture of an organic solvent and an alkaline aqueous solution and a melt polycondensation method comprising the reaction of an aromatic dihydroxy compound with a carbonic acid diester in the presence of a catalyst at high temperature and reduced pressure to remove the generated phenol from the system.

The foreign matters in an aromatic polycarbonate resin are classified generally into foreign materials contaminated through the raw materials or from outside the reaction system and foreign materials generated in the reactor or a flow path of a high-viscosity material after the reaction. Intrusion of the former foreign matters is prevented by providing a filter for the filtration of foreign matter in raw materials or improving the sealing of the reaction system, and the latter foreign matters are removed by filtering with a filter immediately before processing the high-viscosity material into a desired form.

SUMMARY OF THE INVENTION

The development of the melt polycondensation method is being pushed forward because of the limited environmental problem and the possibility to be advantageous from the viewpoint of cost since the method does not use harmful phosgene and methylene chloride as a solvent, however, the quality of the produced aromatic polycarbonate has the problem of inferior color and gel content compared with the polymer produced by interfacial polymerization method.

In the melt polycondensation method, the reaction mixture is transferred between reactors or discharged from the reactor in a hot molten state and the molten reaction mixture is exposed to high temperature during the transfer between reactors or the discharge from the reactor occasionally to cause the discoloration of the polymer or the generation of foreign matters and deteriorate the excellent characteristics such as transparency of the aromatic polycarbonate resin. The discoloration and the generation of foreign matter are undesirable from the viewpoint of product quality especially in an aromatic polycarbonate resin used in an optical use such as compact disk.

Various proposals were presented mainly on the polymerization facility and catalyst, etc., to settle the problems, however, the effects of these measures were still insufficient and there are restrictions in the case of using the resin to an optical use or a sheet such as compact disk required to have high quality.

Furthermore, deterioration caused by retention of the resin such as discoloration, crosslinking and gel-formation is liable to take place in a filter depending upon the temperature and viscosity of the liquid to be filtered, and the size of a particle retained and the amount treated by the filter, exerting considerable influence on the product quality.

These problems are serious especially in an aromatic polycarbonate resin recently applied to optical uses such as DVD, MO and CDR which are required to have high recording density and high precision because the problems of foreign matter, discoloration and gel have direct influence on the optical characteristics such as block error rate and the mechanical characteristics such as tensile properties, flexural properties and toughness of the final product. Further, as the gel particles have a characteristic of changing its shape, gel particles larger than the retained particle size of the filter can pass through the filter to cause an extremely serious problem owing to the deformability of gel particle.

The object of the present invention is to improve the above problems of the conventional technique and provide a process for producing an aromatic polycarbonate resin having excellent quality.

The process of the present invention can produce an aromatic polycarbonate resin having excellent color and free from foreign matter without deterioration of quality in a pipe during the production process because of the high flow speed of the molten reaction mixture in the pipe to decrease the thermal history in the pipe and the smooth flow of the reaction mixture in the pipe, produce, in high efficiency, an aromatic polycarbonate resin having excellent color and transparency as well as excellent color stability and thermal stability by the proper use of a catalyst deactivation agent, and relieve the above problems of conventional technique by the use of the filtration method by the present invention in which an aromatic polycarbonate resin and molded article having excellent quality is obtained by efficiently removing the foreign matters with a polymer filter, while, at the same time, suppressing the discoloration, crosslinking and generation of gel in the filter.

In the specification of the present application, the term "reaction mixture" means a mixture at the starting or proceeding reaction stage of polycondensation reaction in a process for producing an aromatic polycarbonate resin by the melt polycondensation reaction of a mixture containing an aromatic dihydroxy compound and an aromatic carbonic acid diester as main components in the presence of a transesterification catalyst, etc., comprising a nitrogen-containing basic compound and an alkali metal compound and/or alkaline earth metal compound. A mixture having polymerization degree increased to a certain extent is called as a "prepolymer" by the general chemical term. A mixture having further increased polymerization degree is called a "polymer" by the general chemical term.

DETAILED DESCRIPTION OF THE INVENTION

The invention of the present application comprises the following items.

1. A process for the production of an aromatic polycarbonate resin comprising filtering an aromatic polycarbonate resin having a viscosity-average molecular weight of 10,000 or more in a molten state with a filter having a retained particle size of 40 $\mu$m or less under a pressure difference of 20 kg/cm$^2$ or more.

2. The process for the production of an aromatic polycarbonate resin according to item 1, wherein the filter having a retained particle size of 40 $\mu$m or less is a filter having a retained particle size of 20 $\mu$m or less.

3. A process for the production of an aromatic polycarbonate resin comprising filtering an aromatic polycarbonate resin having a viscosity-average molecular weight of 10,000 or more in a molten state with a filter having a retained particle size of 10 $\mu$m or less under a pressure difference of 40 kg/cm$^2$ or more.

4. The process for the production of an aromatic polycarbonate resin according to any one of items 1 to 3, wherein a quantity of the aromatic polycarbonate resin to be treated is 50 kg/m$^2$/hr or more based on a unit area of the filter.

5. The process for the production of an aromatic polycarbonate resin according to any one of the above items 1 to 3, wherein a ratio V/W of volume V (L) in a filtration vessel to flow rate W (L/min) of the filtered polymer is within a range of 0.2 to 10 min.

6. The process for the production of an aromatic polycarbonate resin according to any one of items 1 to 3, wherein a maximum area A (cm$^2$) of a polymer flow path in a filtration vessel and a flow rate W satisfy the requirement that a value W×1,000/A is from 1 cm/min to 10,000 cm/min.

7. The process for the production according to any one of items 1 to 3, wherein the aromatic polycarbonate resin is an aromatic polycarbonate resin produced by polycondensation of an aromatic diol compound and a carbonic acid diester compound in the presence or absence of a catalyst.

8. The process for production according to any one of items 1 to 3, wherein the aromatic polycarbonate resin produced by the polycondensation of an aromatic diol compound and a carbonic acid diester compound in the presence or absence of a catalyst is, after the addition of an additive as required, directly filtered with a filter in molten state without cooling and solidifying the resin.

9. A process for the production of an aromatic polycarbonate resin comprising adding a catalyst deactivation agent to a system within 2 hours after completion of a melt polycondensation reaction in the production of an aromatic polycarbonate resin by the melt polycondensation of a mixture containing an aromatic dihydroxy compound and an aromatic carbonic acid diester as main components in the presence of a catalyst.

10. A process for the production of an aromatic polycarbonate resin wherein a flow velocity of a reaction mixture in a pipe through which a molten reaction mixture passes is 0.5 cm/sec or more in a production of an aromatic polycarbonate resin by continuous melt polycondensation of a mixture containing an aromatic dihydroxy compound and an aromatic carbonic acid diester as main components in the presence of a catalyst.

11. A process for the production of an aromatic polycarbonate resin wherein a flow velocity of a reaction mixture in a pipe through which a molten reaction mixture passes is 2 cm/sec or more in a production of an aromatic polycarbonate resin by continuous melt polycondensation of a mixture containing an aromatic dihydroxy compound and an aromatic carbonic acid diester as main components in the presence of a catalyst.

12. The process for the production of an aromatic polycarbonate resin according to the item 10 or 11, wherein a viscosity-average molecular weight of the reaction mixture in a pipe through which the molten reaction mixture passes is 1,000 or more.

13. The process for the production of an aromatic polycarbonate resin according to the item 10 or 11, wherein a viscosity-average molecular weight of the reaction mixture in a pipe through which the molten reaction mixture passes is 10,000 or more.

14. The process for the production of an aromatic polycarbonate resin according to the item 10 or 11, wherein a sum of average retention times of the reaction mixture in pipes through which the molten reaction mixture passes is not longer than 3 hours.

15. The process for the production of an aromatic polycarbonate resin according to the item 10 or 11, wherein a wall surface temperature of a pipe through which the molten reaction mixture passes is set to be higher than a temperature of the reaction mixture in the pipe.

16. The process for the production of an aromatic polycarbonate resin according to the item 10 or 11, wherein the pipe through which the molten reaction mixture passes is a cold-drawn stainless steel pipe.

17. The process for the production of an aromatic polycarbonate resin according to the item 10 or 11, wherein the pipe through which the molten reaction mixture passes is a stainless steel pipe having a buff-finished inner surface.

18. The process for the production of an aromatic polycarbonate resin according to item 8, wherein a catalyst deactivation agent is added to a system within 2 hours after completion of the melt polycondensation reaction in the production of an aromatic polycarbonate resin by the melt polycondensation of mixture containing an aromatic dihydroxy compound and an aromatic carbonic acid diester as main components in the presence of a catalyst.

19. The process for the production of an aromatic polycarbonate resin according to item 8, wherein the flow velocity of a reaction mixture in a pipe through which the molten reaction mixture passes is 0.5 cm/sec or more in the production of an aromatic polycarbonate resin by the continuous melt polycondensation of a mixture containing an aromatic dihydroxy compound and an aromatic carbonic acid diester as main components in the presence of a catalyst.

20. The process for the production of an aromatic polycarbonate resin described in item 18, wherein the flow velocity of a reaction mixture in a pipe through which the molten reaction mixture passes is 0.5 cm/sec or more in the production of an aromatic polycarbonate resin by the continuous melt polycondensation of a mixture containing an aromatic dihydroxy compound and an aromatic carbonic acid diester as main components in the presence of a catalyst.

21. A molded article of an aromatic polycarbonate resin produced by directly processing an aromatic polycarbonate resin obtained by the method of item 8 into a desired product form without cooling and solidifying the produced resin.

22. A molded article of an aromatic polycarbonate resin produced by directly processing an aromatic polycarbonate resin obtained by the method according to item 18 into a desired product form without cooling and solidifying the produced resin.

23. A molded article of an aromatic polycarbonate resin produced by directly processing an aromatic polycarbonate resin obtained by the method according to item 19 into a desired product form without cooling and solidifying the produced resin.

24. A molded article of an aromatic polycarbonate resin produced by directly processing an aromatic polycarbonate resin obtained by a method according to item 20 into a desired product form without cooling and solidifying the produced resin.

25. The process for the production of an aromatic polycarbonate resin according to item 8, wherein the viscosity-average molecular weight of the reaction mixture in a pipe through which the molten reaction mixture passes is 10,000 or more.

26. The process for the production of an aromatic polycarbonate resin according to item 8, wherein a wall surface temperature of a pipe through which the molten reaction mixture passes is set to be higher than the temperature of the reaction mixture in the pipe.

27. The process for the production of an aromatic polycarbonate resin described in item 18, wherein the viscosity-average molecular weight of the reaction mixture in a pipe through which the molten reaction mixture passes is 10,000 or more.

28. The process for the production of an aromatic polycarbonate resin according to item 18, wherein a wall surface temperature of a pipe through which the molten reaction mixture passes is set to be higher than the temperature of the reaction mixture in the pipe 29. A molded article of an aromatic polycarbonate resin produced by directly processing an aromatic polycarbonate resin obtained by the method according to item 25 into a desired product form without cooling and solidifying the produced resin.

30. A molded article of an aromatic polycarbonate resin produced by directly processing an aromatic polycarbonate resin obtained by the method according to item 26 into a desired product form without cooling and solidifying the produced resin.

31. A molded article of an aromatic polycarbonate resin produced by directly processing an aromatic polycarbonate resin obtained by the method according to item 27 into a desired product form without cooling and solidifying the produced resin.

32. A molded article of an aromatic polycarbonate resin produced by directly processing an aromatic polycarbonate resin obtained by the method according to item 28 into a desired product form without cooling and solidifying the produced resin 33. A process for the production of an aromatic polycarbonate resin comprising filtering an aromatic polycarbonate resin having a viscosity average molecular weight of 10,000 or more in a molten state with (1) a filter unit constructed by piling up a plurality of disk type filter elements having an outer diameter of 4 to 15 inches, an inner diameter/outer diameter ratio of 1/7 or more and a retained particle size of 40 $\mu$m or less under (2) a pressure difference of 20 kg/cm$^2$ or more.

34. The process for the production of an aromatic polycarbonate resin according to item 33, wherein the disk type filter elements have a retained particle size of 20 $\mu$m or less.

35. The process for the production of an aromatic polycarbonate resin according to item 33, wherein the disk type filter elements have a retained particle size of 10 $\mu$m or less and the pressure difference is 40 kg/cm$^2$ or more.

36. The process for the production of an aromatic polycarbonate resin according to item 33, wherein the quantity of the aromatic polycarbonate resin to be treated is 50 kg/m$^2$/hr or more based on the unit area of the filter unit.

37. The process for the production of an aromatic polycarbonate resin according to item 33, wherein the disk type filter elements have an inner diameter/outer diameter ratio of 1/5 or more.

38. The process for the production of an aromatic polycarbonate resin according to item 33, wherein the disk type filter elements have an outer diameter of 6 to 12 inches.

39. The process for the production of an aromatic polycarbonate resin according to item 33, wherein the filter unit is constructed by piling up together 5 to 500 disk type filter elements.

40. The process for the production of an aromatic polycarbonate resin according to item 33, wherein the distance between adjacent disk type filter elements of the filter unit is 5 mm or less.

41. The process for the production of an aromatic polycarbonate resin according to item 33, wherein one filter unit is installed in one filtration vessel.

42. The process for the production of an aromatic polycarbonate resin according to item 41, wherein the ratio (V/W) of the volume V (L) of the filtration vessel to the flow rate W (L/min) of the resin in the vessel is in the range of 0.2 to 10 min.

The process of the present invention for the production of an aromatic polycarbonate resin is concretely described as follows.

Aromatic dihydroxy compounds used in the present invention include, for example,
bis(4-hydroxyphenyl)methane,
2,2-bis(4-hydroxyphenyl)propane,
2,2-bis(4-hydroxy-3-methylphenyl)propane,
4,4-bis(4-hydroxyphenyl)heptane,
2,2-bis(4-hydroxy-3,5-dichlorophenyl)propane,
2,2-bis(4-hydroxy-3,5-dibromophenyl)propane,
bis(4-hydroxyphenyl)oxide,
bis(3,5-dichloro-4-hydroxyphenyl)oxide,
p,p'-dihydroxydiphenyl,
3,3'-dichloro-4,4'-dihydroxydiphenyl,
bis(hydroxyphenyl)sulfone, resorcinol, hydroquinone,
1,4-dihydroxy-2,5-dichlorobenzene,
1,4-dihydroxy-3-methylbenzene,
bis(4-hydroxyphenyl)sulfide and
bis(4-hydroxyphenyl)sulfoxide, and an especially preferable compound is 2,2-bis(4-hydroxyphenyl)propane.

Carbonic acid diesters used in the present invention include, for example, diphenyl carbonate, ditolyl carbonate, bis(chlorophenyl) carbonate, m-cresyl carbonate, dinaphthyl carbonate, bis(diphenyl) carbonate, dimethyl carbonate, diethyl carbonate, dibutyl carbonate and dicyclohexyl carbonate, and diphenyl carbonate is especially preferable among the above examples.

The ratio of two kinds of raw materials to be used in the present invention described by the molar ratio obtained through dividing the used mol number of the carbonic acid diester by the used mol number of the aromatic dihydroxy compound, is preferably selected within the range of 1.00 to 1.10.

The aromatic polycarbonate resin of the present invention may further contain, as required, aliphatic diols such as ethylene glycol, 1,4-butanediol, 1,4-cyclohexanedimethanol and 1,10-decanediol, dicarboxylic acids such as succinic acid, isophthalic acid, 2,6-naphthalenedicarboxylic acid, adipic acid, cyclohexanecarboxylic acid and terephthalic acid and oxy acids such as lactic acid, p-hydroxybenzoic acid and 6-hydroxy-2-naphthoic acid.

Although there is no particular restriction to the kind of catalyst to be used in the present invention, a transesterification catalyst comprising a basic nitrogen compound and an alkali metal compound and/or alkaline earth metal compound can be used in the process.

There is no particular restriction also on the alkali metal and/or alkaline earth metal compound to be used in the present invention as long as the compound does not cause deterioration of the color of the aromatic polycarbonate resin, and various known compounds can be used in the process.

Examples of alkali metal compound usable as a catalyst include hydroxide, bicarbonate, carbonate, acetate, nitrate, nitrite, sulfite, cyanate, thiocyanate, stearate, borohydride, benzoate, hydrogen phosphate, bisphenol salt and phenol salt of an alkali metal.

Concrete examples of the above compounds include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium nitrate, potassium nitrate, lithium nitrate, sodium nitrite, potassium nitrite, lithium nitrite, sodium sulfite, potassium sulfite, lithium sulfite, sodium cyanate, potassium cyanate, lithium cyanate, sodium thiocyanate, potassium thiocyanate, lithium thiocyanate, sodium stearate, potassium stearate, lithium stearate, sodium borohydride, potassium borohydride, lithium borohydride, sodium phenylborate, sodium benzoate, potassium benzoate, lithium benzoate, disodium hydrogen phosphate, dipotassium hydrogen phosphate, dilithium hydrogen phosphate, disodium salt, dipotassium salt or dilithium salt of bisphenol A, and sodium salt, potassium salt and lithium salt of phenol.

The alkaline earth metal compounds to be used as a catalyst include e.g. hydroxide, bicarbonate, carbonate, acetate, nitrate, nitrite, sulfite, cyanate, thiocyanate, stearate, benzoate, bisphenol salt and phenol salt of an alkaline earth metal Concrete examples of the above compounds include calcium hydroxide, barium hydroxide, strontium hydroxide, calcium bicarbonate, barium bicarbonate, strontium bicarbonate, calcium carbonate, barium carbonate, strontium carbonate, calcium acetate, barium acetate, strontium acetate, calcium nitrate, barium nitrate, strontium nitrate, calcium nitrite, barium nitrite, strontium nitrite, calcium sulfite, barium sulfite, strontium sulfite, calcium cyanate, barium cyanate, strontium cyanate, calcium thiocyanate, barium thiocyanate, strontium thiocyanate, calcium stearate, barium stearate, strontium stearate, calcium borohydride, barium borohydride, strontium borohydride, calcium benzoate, barium benzoate, strontium benzoate, calcium salt, barium salt and strontium salt of bisphenol A and calcium salt, barium salt and strontium salt of phenol.

In the present invention, as is required, (a) an alkali metal salt of an ate complex of a group 14 element of the periodic table or (b) an alkali metal salt of an oxo acid of a group 14 element of the periodic table can be used as the alkali metal compound for the catalyst. The group 14 element of the periodic table means silicon, germanium or tin.

The alkali metal salts of ate complex of the group 14 element of the periodic table are compounds described in JP-A 7-268091 (hereunder, JP-A means "Japanese Unexamined Patent Publication"), concretely, germanium (Ge) compounds such as $NaGe(OMe)_5$, $NaGe(OEt)_3$, $NaGe(OPr)_5$, $NaGe(OBu)_5$, $NaGe(OPh)_5$, $LiGe(OMe)_5$, $LiGe(OBu)_5$ and $LiGe(OPh)_5$.

Concrete examples of tin (Sn) compounds include $NaSn(OMe)_3$, $NaSn(OMe)_2(OEt)$, $NaSn(OPr)_3$, $NaSn(O\text{-}n\text{-}C_6H_{13})_3$, $NaSn(OMe)_5$, $NaSn(OEt)_5$, $NaSn(OBu)_5$, $NaSn(O\text{-}n\text{-}C_{12}H_{25})_5$, $NaSn(OEt)$, $NaSn(OPh)_5$ and $NaSnBu_2(OMe)_3$.

Preferable examples of the alkali metal salt of oxo acid of the group 14 element of the periodic table include for example an alkali metal salt of silicic acid, an alkali metal salt of stannic acid, an alkali metal salt of germanium(II) acid (germanous acid) and an alkali metal salt of germanium (IV) acid (germanic acid).

The alkali metal salt of silicic acid is e.g. an acidic or neutral alkali metal salt of monosilicic acid or its condensation product, such as monosodium orthosilicate, disodium orthosilicate, trisodium orthosilicate and tetrasodium orthosilicate.

The alkali metal salt of stannic acid is e.g. an acidic or neutral alkali metal salt of monostannic acid or its condensation product, such as disodium monostannate ($Na_2SnO_3 \cdot xH_2O$, x=0 to 5) and tetrasodium monostannate ($Na_4SnO_4$).

The alkali metal salt of germanium(II) acid (germanous acid) is e.g. an acidic or neutral alkali metal salt of monogermanous acid or its condensation product, such as monosodium germanite ($NaHGeO_2$).

The alkali metal salt of germanium(IV) acid (germanic acid) is e.g. an acidic or neutral alkali metal salt of monogermanium(IV) acid or its condensation product, such as monolithium orthogermanate ($LiH_3GeO_4$), disodium orthogermanate, tetrasodium orthogermanate, disodium digermanate ($Na_2Ge_2O_5$), disodium tetragermanate ($Na_2Ge_4O_9$) and disodium pentagermanate ($Na_2Ge_5O_{11}$).

The alkali metal compound or the alkaline earth metal compound are used as a catalyst preferably in an amount to give from $1 \times 10^{-8}$ to $5 \times 10^{-5}$ equivalent in terms of the alkali metal element or the alkaline earth metal element per 1 mol of the aromatic diol compound. More preferable ratio is $5 \times 10^{-7}$ to $1 \times 10^{-5}$ equivalent on the same basis. When the amount of the alkali metal element or alkaline earth metal element in the catalyst is out of the range of $1 \times 10^{-8}$ to $5 \times 10^{-5}$ equivalent, various undesirable problems arise such as bad influence on various properties of the produced aromatic polycarbonate resin and insufficient progress of transesterification reaction resulting in failure in getting an aromatic polycarbonate having high molecular weight.

The nitrogen-containing basic compounds to be used as a catalyst include, for example, ammonium hydroxides having alkyl group, aryl group, alkylaryl group, etc., such as tetramethylammonium hydroxide ($Me_4NOH$), tetraethylammonium hydroxide (Et$_4$NOH), tetrabutylammonium hydroxide (Bu$_4$NOH), benzyltrimethylammonium hydroxide (φ-CH$_2$(Me)$_3$NOH) and hexadecyltrimethylammonium hydroxide, tertiary amines such as triethylamine, tributylamine, dimethylbenzylamine and hexadecyldimethylamine and basic salts such as tetramethylammonium borohydride (Me$_4$NBH$_4$), tetrabutylammonium borohydride (Bu$_4$NBH$_4$), tetrabutylammonium tetraphenylborate (Me$_4$NBPh$_4$) and tetrabutylammonium tetraphenylborate (Bu$_4$NBPh$_4$).

The above nitrogen-containing basic compound is used preferably in an amount to give $1 \times 10^{-5}$ to $5 \times 10^{-3}$ equivalent in terms of the ammoniacal nitrogen atom in the nitrogen-containing basic compound based on 1 mol of the aromatic diol compound. The ratio is more preferably $2 \times 10^{-5}$ to $5 \times 10^{-4}$ equivalent, and especially preferably $5 \times 10^{-5}$ to $5 \times 10^{-4}$ equivalent on the same basis.

The ratio of the alkali metal compound, alkaline earth metal compound and nitrogen-containing basic compound to the charged aromatic diol compound (also called aromatic dihydroxy compound) is expressed in the present invention by "W (numerical value) equivalent of Z (name of the compound) in terms of metal or basic nitrogen based on 1 mol of the aromatic dihydroxy compound". It means that the amount of Z corresponds to W mol when Z has one sodium atom as in the case of sodium phenoxide or 2,2 -bis (4 -hydroxyphenyl) propane monosodium salt or has one basic nitrogen atom as in the case of triethylamine, and corresponds to W/2 mol when the compound has two sodium atoms, etc., as in the case of 2,2-bis(4-hydroxyphenylpropane)disodium salt.

At least one kind of cocatalyst selected from the group of oxo acids of the group 14 element of the periodic table and oxides of said element may be used as required in combination with the above catalyst in the polycondensation reaction of the present invention.

Undesirable side reactions such as branching reaction liable to occur during polycondensation reaction and the generation of foreign matter or burn mark in a molding apparatus during molding are more effectively suppressed without ill-affecting the terminal blocking reaction and polycondensation reaction rate by using these cocatalysts at specific ratios.

The present invention relating to the flow velocity of the reaction mixture is characterized by decreasing the thermal history applied to the reaction mixture in a pipe through which the mixture passes while being transferred between the reactors or discharged from the reactors in molten state and smoothing the flow of the reaction mixture in the pipe in the production of an aromatic polycarbonate resin by the continuous melt polycondensation of a mixture containing an aromatic dihydroxy compound and a carbonic acid diester as main components in the presence of a catalyst.

An aromatic polycarbonate resin having excellent color and free from foreign matter can be produced according to the production process of the aromatic polycarbonate resin of the present invention relating to the flow velocity of the reaction mixture without causing the deterioration of quality in a pipe in production, because the reaction mixture has high flow velocity in the pipe through which the molten reaction mixture passes, the mixture is subjected to little thermal history in the pipe and the reaction mixture flows smoothly in the pipe.

Melt-polymerization is attracting attention because it is a process for the production of an aromatic polycarbonate resin without using phosgene and halogenated solvents, causing little environmental problem and is expected to be advantageous from the viewpoint of cost, however, the process has a problem of giving a polymer inferior to an aromatic polycarbonate resin produced by interfacial polymerization in the quality, especially color and gel formation. Various methods were proposed to solve the problem, however, satisfiable method has not been found at present.

In consideration of the present status described above, the inventors of the present invention have studied the equipment to be used in the process while paying attention to the contact of the reaction mixture with the equipment and found that pipes accounting for major part in the contact area per unit volume exert considerable influence on the quality of the produced aromatic polycarbonate resin and attained the present invention.

According to the investigation performed by the inventors of the present invention, proposals paying attention to pipes are not absolutely absent heretofore, and a proposal specifying the surface roughness of a pipe to 5 μm or less has been known. However, the proposal is insufficient by itself and it has been found that comprehensive consideration of several factors is necessary for attaining a considerable effect. Although the reason is not yet clear, the polymer quality is supposed to be remarkably influenced by two factors; the first supposed factor being that the reaction mixture is transferred in a pipe in the state of laminar flow owing to the generally high melt-viscosity of the reaction mixture and the laminar film (or boundary film) (a part contacting with the inner wall of the pipe and having extremely slow flow speed of the reaction mixture) in this state forms a pseudo-dead space; and the second supposed factor being that, in contrast with other condensation polymerization polymer such as polyethylene terephthalate, an aromatic polycarbonate resin has a characteristic of causing branching by itself to form a crosslinked structure to be gelled by the heating over a long period even if other factors such as oxygen are completely eliminated. The present invention comprises the elimination of the pseudo-dead space as completely as possible.

In the present invention relating to the flow velocity of the reaction mixture and producing an aromatic polycarbonate resin, the deterioration of the quality of the reaction mixture in a pipe can be decreased the more, the more the flow velocity of the molten reaction mixture passing through the pipe is increased, thus providing an aromatic polycarbonate resin having excellent color and free from foreign matter. The flow velocity of the molten reaction mixture in a pipe is preferably 0.5 cm/sec or more and especially preferably 2 cm/sec or more. The term "pipe" which can also be referred to as "line" means a pipe connecting reactors through which the molten reaction mixture passes and a pipe through which the molten reaction mixture is discharged from the reactor.

In the present invention relating to the flow velocity of the reaction mixture, the viscosity-average molecular weight of the reaction mixture is preferably 1,000 or more, more preferably 10,000 or more in the process for the production of an aromatic polycarbonate resin. If the viscosity-average molecular weight is smaller than the above limit, the effect is decreased supposedly by the decrease of the generation of the pseudo-dead space.

It is important to shorten the average retention time of a reaction mixture in a pipe to decrease the thermal history of the reaction mixture in the pipe. In the process of the present invention relating to the flow velocity of the reaction mixture and producing an aromatic polycarbonate resin, the average retention time of the reaction mixture in a pipe is preferably 3 hours or shorter, more preferably 1 hour or shorter.

In the present invention relating to the flow velocity of the reaction mixture and producing an aromatic polycarbonate resin, it is preferable to set the wall surface temperature of the pipe through which the reaction mixture passes to be higher than the temperature of the reaction mixture passing through the pipe to decrease the melt viscosity of the reaction mixture on the wall surface of the pipe in order to make the flow of the reaction mixture smooth in the pipe and decrease the lowering of the flow velocity of the reaction mixture on the wall surface of the pipe. The wall temperature of the pipe is set to be higher than the temperature of the reaction mixture in the pipe by preferably 2 to 50° C., more preferably 5 to 20° C.

Processing method and material of the pipe are also important to attain smooth flow of the reaction mixture in a pipe connecting reactors or a pipe to discharge the mixture from a reactor. In the process of the present invention relating to the flow velocity of the reaction mixture and producing an aromatic polycarbonate resin, the pipe through which the molten reaction mixture passes is preferably a cold-drawn stainless steel pipe. The material of the stainless steel includes e.g. SUS304, SUS316 and SUS316L as specified by JIS.

In the process of the present invention relating to the flow, velocity of the reaction mixture and producing an aromatic polycarbonate resin, the inner surface of the pipe through which the molten reaction mixture passes is preferably subjected to buff-finish to make the flow of the reaction mixture smooth by forming as smooth a surface as possible. The degree of the buff-finishing treatment is preferably #100 or finer, more preferably #400 or finer.

It has been clarified that the quick deactivation of used polymerization catalyst after the polymerization of the above-mentioned raw materials with a catalyst is also extremely important in the present invention for getting an aromatic polycarbonate resin having excellent quality.

As a result of investigation performed by the inventors of the present invention, it has been found that an aromatic polycarbonate resin having excellent color and transparency can be produced, in the production of an aromatic polycarbonate resin by the melt-polycondensation of a mixture containing a carbonic acid diester and an aromatic dihydroxy compound in the presence of a catalyst, by shortening the retention time, in a molten state at a high temperature after the melt-polymerization reaction, of the aromatic polycarbonate resin containing the catalyst with remaining catalytic activity.

The cause is not yet clear, however, it is supposed as follows.

An aromatic polycarbonate resin with remaining catalytic activity is transferred in the apparatus in an non-evacuated molten state during the period after the completion of the polymerization reaction and before the discharge from the polymerization facility. Depolymerization reaction of the aromatic polycarbonate resin takes place during the retention time in the non-evacuated molten state at a high temperature by the phenol remaining in the aromatic polycarbonate resin as a reaction by-product and the catalyst with remaining catalytic activity. The depolymerization reaction decreases the molecular weight of the aromatic polycarbonate resin and increases the OH groups of the polymer terminals. The color of the polymer is supposed to be deteriorated during the retention time of the polymer with remaining catalytic activity in the non-evacuated hot molten state because the increase of the OH groups on the polymer terminals results in the lowering of the heat-resistance of the aromatic polycarbonate resin.

According to the process of the present invention relating to a catalyst deactivation agent and producing an aromatic polycarbonate resin, an aromatic polycarbonate resin having excellent polymer color can be produced in high efficiency without causing the lowering of molecular weight during the retention at a high temperature up to the discharge of the resin from the polymerization reactor by deactivating the catalyst as quickly as possible after the completion of the polymerization reaction.

In the process of the present invention relating to a catalyst deactivation agent and producing an aromatic polycarbonate resin, the addition timing of the catalyst deactivation agent to be added to the system to eliminate the activity of the catalyst remaining in the aromatic polycarbonate resin at the end of the melt polymerization reaction is preferably within 2 hours, more preferably within 1 hour, further preferably within 30 minutes and most preferably within 15 minutes from the end of the melt polycondensation reaction.

The term "end of melt polymerization reaction" means the time when the viscosity-average molecular weight of the produced aromatic polycarbonate resin reaches a target level and the resin is discharged from the evacuated reactor to a non-evacuated state. For example, in the case of using a pump for the discharge of the polymer, the term "the addition timing of the catalyst deactivation agent is within 2 hours after the end of the melt polycondensation reaction" means that the average retention time of the resin in the apparatus from the polymer pump to the addition of the deactivation agent is within 2 hours.

Conventional compounds are effectively usable as the catalyst deactivation agent to be used in the present invention relating to a catalyst deactivation agent and, among these compounds, ammonium salts and phosphonium salts of sulfonic acids are preferable and the above salts of dodecylbenzenesulfonic acid such as dodecylbenzenesulfonic acid tetrabutylphosphonium salt and the above salts of p-toluenesulfonic acid such as p-toluenesulfonic acid tetrabutylammonium salt are more preferable. Other preferably usable compounds are esters of sulfonic acids such as methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate and phenyl p-toluenesulfonate. Dodecylbenzenesulfonic acid tetrabutyl-phosphonium salt is most preferable among the above compounds.

The addition amount of the catalyst deactivation agent is 0.5 to 50 equivalent, preferably 0.5 to 10 equivalent, more preferably 0.8 to 5 equivalent based on 1 mol of the above main polycondensation catalyst selected from alkali metal compounds and alkaline earth metal compounds. The equivalent of the catalyst deactivation agent is the number of sites reactive with one valence of the catalytic metal and existing in one molecule of the deactivation agent. One mol of the catalyst deactivation agent is equal to one equivalent when the number of said reactive sites is one in one molecule of the deactivation agent or one mol is equal to two equivalent when two reactive sites are present in one molecule. The above addition amount of the catalyst deactivation agent usually corresponds to the use of 0.01 to 500 ppm of the agent based on the aromatic polycarbonate resin.

These catalyst deactivation agents are added and kneaded to a molten aromatic polycarbonate resin directly or in a form dissolved or dispersed in a proper solvent or as a master pellet. There is no particular restriction on the kind of facility to perform the above operation, however, the use of a twin-screw extruder, etc., is preferable. A vent-type twin-screw extruder is especially preferable in the case of using the catalyst deactivation agent in a form dissolved or dispersed in a solvent.

As a result of investigation performed by the inventors of the present invention, it has been found that the foreign matters in an aromatic polycarbonate resin can be removed in extremely high efficiency by a specific filtration treatment.

The aromatic polycarbonate resin in the present invention relating to filtration treatment has no particular restriction. It includes an aromatic polycarbonate resin produced by reacting an aromatic diol compound with a carbonate precursor, such as an aromatic polycarbonate resin produced by interfacial polymerization comprising the reaction of an aromatic diol alkali metal salt with phosgene or an aromatic polycarbonate resin produced by melt polymerization comprising the reaction of an aromatic diol with an aromatic carbonic acid ester. Among these aromatic polycarbonate resins, an aromatic polycarbonate resin produced by melt polymerization method is most suitable for performing the present invention because the resin is directly delivered from a polymerization vessel in molten state, thus eliminating the remelting of the polymer.

There is no particular restriction on the molecular weight of the aromatic polycarbonate resin to be used in the present invention relating to filtration treatment, however, the use of an aromatic polycarbonate resin having a viscosity-average molecular weight of 10,000 or more is preferable as an aromatic polycarbonate resin having a low polymerization degree has an extremely limited application field due to its poor physical properties. Extremely high molecular weight results in the increase of the filtration pressure with a polymer filter, thus a resin having a viscosity-average molecular weight of not higher than 50,000 is suitable for the working of the present invention relating to the filtration treatment.

The filter used in the present invention relating to the filtration treatment is a filter to remove foreign matters existing in an aromatic polycarbonate resin by filtration. Conventional filters such as a candle-type filter, pleats filter and disk-type filter can be used in general and a disk-type filter is most preferable among these filters.

There is no particular restriction on the material of the filter provided that the material is inert to the aromatic polycarbonate resin produced by polymerization and the material is free from components eluted into the aromatic polycarbonate resin. Metals, especially stainless steel are generally used as the material. Preferable material includes SUS304, SUS316, etc.

The term "retained particle size" used in the present invention relating to the filtration treatment means the minimum size (diameter) of particles which can be collected by the filter in a yield of not less than 95% if the shape of the foreign material is spherical. It can also be referred to as "an absolute removal rating."

The retained particle size of the polymer filter in the present invention relating to the filtration treatment is 50 μm or less, preferably 40 μm or less, more preferably 20 μm or less, further more preferably 10 μm or less, and especially preferably 5 μm or less. The use of a polymer filter having large retained particle size increases the amount of foreign materials in the produced aromatic polycarbonate resin to an undesirable level.

It seems natural that a polymer containing only a little foreign material can be produced by using a filter having a small retained particle size, however, the decrease of retained particle size increases the dead space and, conversely, often lowers the quality of the obtained polymer.

Figure 1:
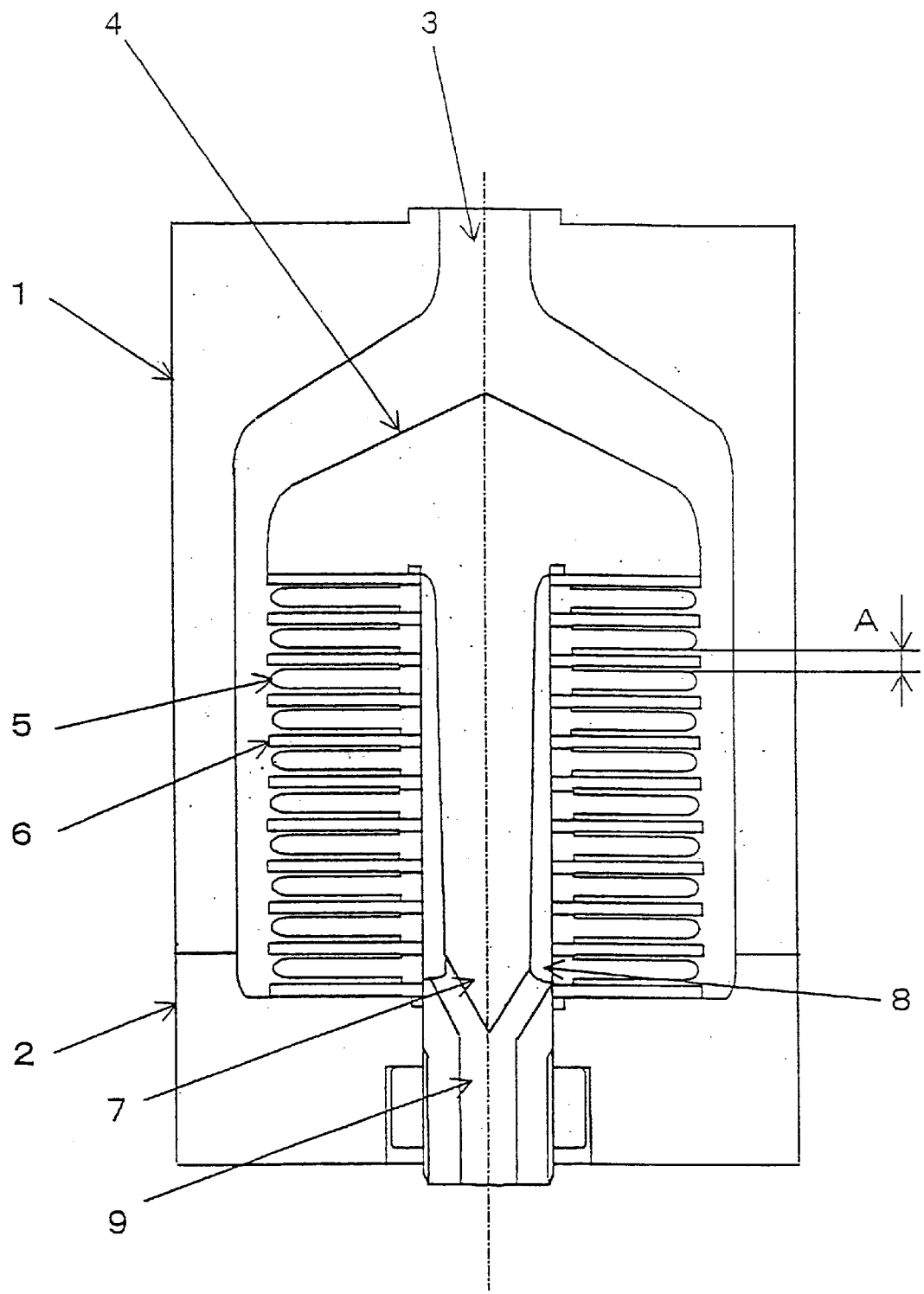
FIG. 1 is a sectional view of a filtration vessel used for the present invention.

Reference Symbols in the Figures Denote the Following Elements.
1. filtration vessel
2. flange plate
3. polymer inflow path
4. filter holder
5. disk type filter element
6. spacer
7. center pole
8. annular groove
9. polymer outflow path
11. opening
12. filter
13. hub
14. retainer
15. support plate
A. lamination interval
B. thickness of secondary flow path
D. outer diameter of disk type filter element
d. inner diameter of disk type filter element The results of researches conducted by the inventors of the present invention have revealed that foreign matter contained in the aromatic polycarbonate can be removed extremely efficiently by a specific filtration treatment using a filter unit which will be described hereinafter.

The molecular weight of the aromatic polycarbonate used in the present invention to subjected to the filtration treatment is not particularly limited but an aromatic polycarbonate having a viscosity average molecular weight of 10,000 or more is preferably used because an aromatic polycarbonate having a low degree of polymerization has low physical properties and its application is extremely limited. When the molecular weight is too high, the filtration operation pressure of the filter unit becomes high. Therefore, an aromatic polycarbonate which has a viscosity average molecular weight of 50,000 or less is preferred for filtration in the present invention.

The filter unit used in the present invention is an apparatus for removing foreign matter existent in a polycarbonate by filtration and comprises an inflow path for introducing a molten polycarbonate to be filtered to filter elements, filter elements for filtering the polycarbonate, an outflow path for discharging the filtered polycarbonate to the outside of the filter, and a vessel for installing these. The filter element is a polycarbonate filtering means installed in the filter unit.

Figure 2:
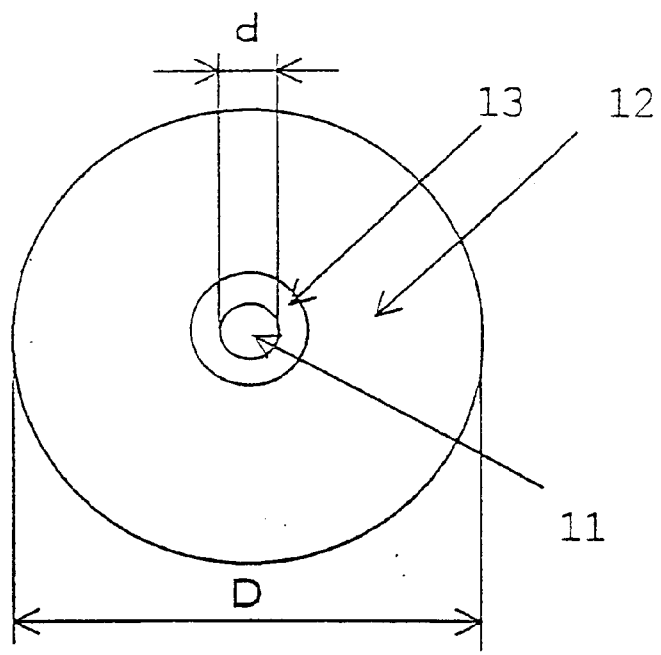
FIG. 2 is a diagram of a disk type filter element according to the present invention.
Figure 3:
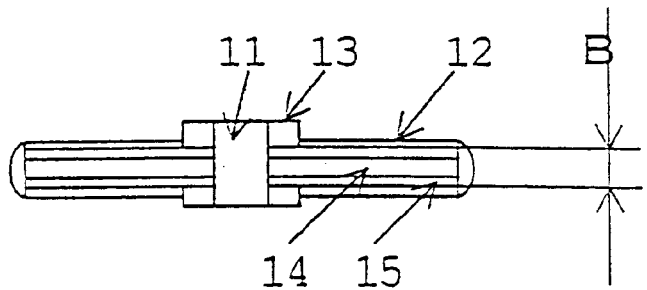
FIG. 3 is a sectional view of the disk type filter element of FIG. 2.

The disk type filter element and filtration vessel of the present invention will be described hereinbelow with reference to FIGS. 1 to 3. FIGS. 1 to 3 show the present invention and the present invention is not limited by these figures and a description based on these figures.

FIG. 1 is a sectional view of the filtration vessel in which disk type filter elements 5 are piled up together with a spacer 6 therebetween and pressed against a flange plate 2 by a filter holder 4 to be fixed in a space formed by a filtration vessel 1 and the flange plate 2.

As shown in FIGS. 2 and 3 each of the disk type filter elements 5 has a filter medium 12 for filtering a polymer and a hub 13 and the hubs 13 are placed one upon the other to form a ring-shaped flow path (annular groove) (numeral 8 in FIG. 1) consisting of a center pole 7 and a hole 11 when the disk type filter elements 5 are piled up together.

The center pole 7 is a pole which has a polygonal or star-shaped cross section, is inscribed in the opening 11 and serves to determine the piling up position in a radial direction by alternately piling up the disk type filter elements 5 and the spacer 6 through the center pole 7.

The hubs 13 are pressed against each other or against the flange plate 2 by the filter holder 4 shown in FIG. 1 and fixed.

The polymer passes through the polymer inflow path 3 and is filtered by the disk type filter elements 5, and the filtered polymer passing through the annular groove 8 is discharged to the outside of the filtration vessel through the polymer outflow path 9.

As shown in FIG. 3, a support plate 15 composed of a punching plate or the like and a retainer 14 composed of a metal net of large meshes or the like are disposed within the disk type filter element 5 (secondary flow path) so that the thickness B of the secondary flow path is prevented from becoming smaller by pressure at the time of filtration.

In FIG. 1, the piling up interal is expressed by distance A, the outer diameter of the disk type filter element is expressed by distance D, and the inner diameter of the disk type filter element is expressed by distance d.

The filter medium (numeral 12 in FIG. 2) of the disk type filter element used in the present invention serves to directly remove foreign matter contained in the polycarbonate and must retain fixed meshes with a small variation and must have chemical stability against a substance to be treated, heat resistance and a certain measure of pressure resistance. The filter medium is preferably made from a known material which satisfies the above requirements and is the most preferably a metal net formed by weaving a metal thin wire or a filter of a sintered metal fiber texture produced by forming metal short fibers by a wet or dry process and sintering them to fix the texture.

In the present invention, a polycarbonate containing no foreign matter can be produced by filtering a polycarbonate containing foreign matter using at least one filter unit. The filter units used may be arranged in series or parallel to each other.

The filter element used in the filter unit of the present invention is preferably a disk type filter element.

In the case of a polycarbonate obtained by melt polymerization, polymerization is carried out continuously in most cases and a polymerizer and a filter unit are directly connected to each other in most cases. Therefore, a trouble with the filter unit may lead to the interruption of the polymerization process. When the filter units are arranged parallel to each other and used by switching, a quality fluctuation often occurs at the time of switching. Therefore, the filter unit preferably has a long service life (exactly speaking, service life of the filter element) and disk type filter elements are preferably used because they can provide a large filtration area when they are piled up together.

Although the disk type filter elements can provide a large filtration area, they have such a defect that a drift occurs more easily as the filtration area increases.

Meanwhile, according to studies conducted by the inventors of the present invention, it has been found that a polycarbonate itself is easily branched or crosslinked to form a gel by its long-term heat history even when the entry of oxygen is prevented unlike a polyester or polyolefin. Therefore, a drift in the filter unit causes the formation of a gel in the filter unit which is a fatal problem in the case of a polycarbonate. Consequently, to make effective use of the disk type filter elements for the filtration of the polycarbonate, this drift problem must be solved.

Based on the above understanding, the inventors of the present invention have conducted intensive studies to find a solution to the above problem and have found that the above drift problem can be solved by satisfying some conditions before use of the disk type filter elements, thereby making it possible to obtain a high-quality polycarbonate containing no gel or foreign matter for a long time using a filter unit.

Any material may be used as the material of the filter unit and the disk type filter element if it is inactive with a polycarbonate obtained by polymerization and contains no component dissolved in the polycarbonate. Generally speaking, a metal, particularly stainless steel is used. For example, SUS304, SUS316 and the like are preferably used.

The retained particle size of the disk type filter element in the present invention is the opening diameter of the filter medium of the disk type filter element. Supposing that foreign matter is spherical, this size is equivalent to the minimum particle diameter capable of eliminating 95% or more of the foreign matter while it passes through the disk type filter element.

In the present invention, the retained particle size of the disk type filter element is 40 $\mu$m or less, preferably 20 $\mu$m or less, more preferably 10 $\mu$m or less. When the retained particle size of the disk type filter element is too large, the amount of foreign matter contained in the obtained polycarbonate increases disadvantageously.

The ratio of the inner diameter to the outer diameter of the disk type filter element used in the present invention must be 1/7 or more, preferably 1/5 or more. When the ratio is smaller than 1/7, a difference in filterability between the inner circumferential portion and the outer circumferential portion of each disk type filter becomes marked and a gel is easily formed in the outermost circumferential portion and the innermost circumferential portion disadvantageously.

As is obvious from its definition, the inner diameter/outer diameter ratio does not exceed "1".

The above phenomenon that a gel is formed by a drift occurs more easily in the outer circumferential portion than the inner circumferential portion. Therefore, the outer diameter of the disk type filter element used is set to 15 inches (38.1 cm) or less, preferably 12 inches (30.5 cm) or less while the above inner diameter/outer diameter ratio is maintained to obtain a greater effect of preventing a drift.

Meanwhile, a larger outer diameter is advantageous from the viewpoint of the filtration area of the disk type filter element. From this viewpoint, the outer diameter of the disk type filter element used is preferably 4 inches (10.2 cm) or more, more preferably 6 inches (15.2 cm) or more. Therefore, the disk type filter element of the present invention which can prevent a drift and secure a large filtration area preferably has an outer diameter of 15 inches (38.1 cm) or less and 4 inches (10.2 cm) or more, more preferably an outer diameter of 12 inches (30.5 cm) or less and 6 inches (15.2 cm) or more.

The inner diameter of the disk type filter element used in the present invention is not limited if it satisfies the above inner diameter/outer diameter ratio. In the disk type filter element, the filtered polymer is generally discharged to the outside of a system through the polymer flow path (numeral 8 in FIG. 1) around the center pole (numeral 7 in FIG. 1) provided along the inner diameter and an excessively small inner diameter generates a large flow resistance. Therefore, the inner diameter of the flow path is generally 2 inches (5.08 cm) to 3 inches (7.62 cm).

Since a plurality of disk type filter elements are used to form a single filter unit in the present invention, a drift between the disk type filter elements is a big problem to be solved.

Also in this case, the formation of a large filtration area and the prevention of a drift conflict with each other and a drift easily occurs between the disk type filter elements though the filtration area becomes larger as the number of disk type filter elements to be piled up together increases.

According to studies conducted by the inventors of the present invention, the number of disk type filter elements to be piled up together and installed in one filter unit is preferably 5 to 500, more preferably 10 to 200. When the number of disk type filter elements to be piled up together is too large, a drift between adjacent disk type filter elements becomes marked, the quality of the obtained polymer degrades, and the service life of the filter unit may be shortened disadvantageously. When the disk type filter elements to be piled up together and installed in one filter unit are counted as one row, two rows or more of the disk type filter elements are undesirable from the viewpoint of the suppression of a drift. Therefore, when 200 disk type filter elements are to be piled up together, they are preferably piled up together in one row.

To prevent a drift between adjacent disk type filter elements and a drift in one disk type filter element, the interval between adjacent disk type filter elements to be piled up together is also important. This piled up distance is preferably substantially 5 mm or less. It is not preferred to narrow the distance unlimitedly. Basically, the lower limit of the distance is preferably determined based on the following concept.

When a flow path through which the polymer before filtration passes through is considered as a primary flow path and a flow path through which the polymer after filtration passes through is considered as a secondary flow path with the filtration medium as the boundary therebetween, the primary flow path is formed between adjacent disk type filter elements out of the piled up disk type filter elements and the secondary flow path is formed within the disk type filter element. When the primary flow path is narrow at this point (in other words, the distance is narrower than the flow path formed within the disk type filter element), the polymer tends to pass through a filtration layer from the primary flow path by way of the outer circumferential portion of the primary flow path before it reaches the inner circumferential portion of the primary flow path between adjacent disk type filter elements, whereby a dead space is formed in the inner circumferential portion of the disk type filter element to form a gel. When the primary flow path is too wide, the opposite phenomenon occurs and a gel is formed in the outer circumferential portion of the disk type filter element, thereby causing the deterioration of quality and a reduction in the service life of the filter unit. Therefore, it is ideal that the flow resistance of the primary flow path should be equal to the flow resistance of the secondary flow path. To this end, the basic criterion of making the piling up distance between adjacent disk type filter elements (to be referred to as "lamination interval" hereinafter), substantially equal to the thickness of the secondary flow path formed within the disk type filter element is taken. Stated more specifically, the difference between the lamination interval and the thickness of the secondary flow path formed within the disk type filter element used is desirably ±20 % or less of the thickness of the secondary flow path. The thickness of the secondary flow path is the thickness B in FIG. 3.

The lower limit is desirably 0.5 mm in consideration of working accuracy.

In the present invention, the word "substantially" in the phrase "the lamination interval between adjacent disk type filter element is preferably substantially 5 mm or less" means as described in the following paragraphs (1) to (3).

(1) When the lamination interval (evaluated from distance at 10 points on each filter 12) between a pair of adjacent disk type filter elements is measured at optional 10 points on the filter 12 shown in FIG. 2 which are selected such that they have almost the same interval to judge whether it is 5 mm or less, the group of these measurements is called "measurement unit". Each measurement unit has 10 measurement values of lamination interval.

(2) As for the measurement unit in the above paragraph (1), the measurement unit having at least 9 measurements which have a lamination interval of 5 mm or less is called "measurement unit having the accepted interval".

(3) When the above measurement (1) is made on all the lamination intervals between adjacent disk type filter elements to be installed in one filter unit, if the ratio of the measurement units having the accepted interval to the total number of measurement units is 90% or more, "the lamination interval between adjacent disk type filter elements is substantially 5 mm or less".

The method of maintaining the above substantial lamination interval to a predetermined value is not particularly limited. For example, as shown in FIG. 1 a radial or concentric circular spacer 6 made from a wire material having a thickness equal to the predetermined lamination interval is inserted between the disk type filter elements 5.

It is considered as a matter of course that a polycarbonate having a small content of foreign matter is obtained by using filter elements having a small retained particle size for the filtration of the polycarbonate. In fact, when the retained particle size is reduced, the quality of the obtained polymer lowers. This is a phenomenon which is closely connected with the feature of the polycarbonate that a gel is easily formed by the residence of the polymer as described above and occurs due to the expansion of the residence portion of the filter element caused by reducing the retained particle size. Therefore, appropriate operation conditions are required to improve filtration accuracy by using filter elements having a small retained particle size.

It has been found that the control of the pressure difference, the treating liquid volume per unit area of the polymer filter, the average retention time in the polymer filter, the flow velocity (or flow rate) of polymer in the filtration vessel, etc., to optimum levels when using a polymer filter is important in the present invention relating to the filtration treatment, and that an aromatic polycarbonate resin having excellent quality can be stably produced by the use of a polymer filter having a small retained particle size only by performing the above controlling procedures.

The pressure difference in the present invention relating to the filtration treatment means the difference of operation pressures before and after the filtration of a highly viscous substance with the filter of the present invention. The operation pressure difference is preferably 20 kg/cm$^2$ or above in the case of using a polymer filter having a retained particle size of 50 $\mu$m or less and 40 kg/cm$^2$ or above for a polymer filter having a retained particle size of 10 $\mu$m or less. The operation at a pressure difference below the above limit is undesirable because the quality of the produced polymer is not improved or, conversely, often deteriorated with the decrease of the retained particle size. The upper limit of the pressure difference is usually 150 to 200 kg/cm$^2$.

The operation pressure source of the polymer filter is generally a gear pump, a screw feeder, an extruder, etc., and the type is not restricted in the present invention.

The treated amount (quantity) of the aromatic polycarbonate resin per unit area of the filter in the filtration treatment of the present invention means the value obtained by dividing the amount of polymer (kg/hr) passing through the polymer filter by the total filtration area (m$^2$) of the polymer filter and, in the filtration treatment of the present invention, the amount is preferably 50 kg/M²/hr or more, more preferably 100 kg/m²/hr or more and most preferably 150 kg/m²/hr or more. The decrease of the treated amount of the aromatic polycarbonate resin per unit area of the filter below the above limit causes undesirable deterioration of the quality of the produced polymer, especially the deterioration of color and increase of gel content. The upper limit of the treated amount of the aromatic polycarbonate resin per unit area is usually 1,500 to 2,000 kg/m²/hr.

The value of V/W defined by the ratio of the space volume V (L) in the filtration vessel to the flow rate W (L/min) of the filtered polymer is preferably adjusted to 0.2 to 10 min in the filtration treatment of the present invention. The filtration operation pressure undesirably increases when the ratio is below the above limit and the operation at the V/W ratio exceeding the above upper limit causes the deterioration of the color of the produced polymer and, in extreme case, increases the gel content.

The flow velocity of polymer in the filtration vessel in the filtration treatment of the present invention means the average flow velocity in the filtration vessel, which is defined by $W \times 1,000/A$ (cm/min) wherein $A$ (cm²) is the maximum area of the polymer flow path in the filtration vessel and W (L/min) is the flow rate of the filtered polymer.

In the filtration treatment of the present invention, the average flow velocity of polymer is necessary to be maintained within the range of 1 to 10,000 cm/min, preferably 10 to 8,000 cm/min and more preferably 50 to 5,000 cm/min. The operation at an average polymer flow velocity of lower than 1 cm/min gives a polymer having deteriorated quality, and a flow velocity exceeding 10,000 cm/min is also undesirable to cause extremely high filtration operation pressure.

It has been found that an aromatic polycarbonate resin having good quality can be produced by the use of a filter having small retained particle size provided that the operation satisfies the filtration treatment conditions of the present invention described above. The reason is not yet clear, however, it is supposed as follows according to the investigation by the inventors of the present invention.

In the case of filtering a polymer with a filter, the operation under a lower pressure difference is advantageous from the viewpoint of the operation work because it has larger allowance to the maximum operation pressure specified by the strength of the filter element and, accordingly, a longer operation time is possible, corresponding to the allowance.

However, if the same filter element is applied, decreasing of pressure difference will entail increase of the filtration area of the filter, resulting in inevitable increase of the filtration time. The increase in the filtration time will cause the gel formation and produce a product having quality problem to give damage to the object of the present invention.

Furthermore, it has been found that a polymer does not always flow at a uniform flow velocity in a filter element and a channeling phenomenon to cause partial decrease of the flow velocity occurs in the element. It is caused by the non-uniform pressure difference on the surface of the filter element as was estimated by the inspection of the filter at its disassembling after filtration in which local formation of gel was found at the outer circumferential part, etc., of a disk-type filter.

Accordingly, the flow velocity in a polymer filter, the average retention time and the average flow velocity in filtration are closely related to the local retention and thermal history of the aromatic polycarbonate resin in filtration operation and, it is supposed that only by keeping the above factors within respective specific ranges, an aromatic polycarbonate resin having high quality can be produced using a filter having small retained particle size.

In the present invention, the aromatic polycarbonate resin may be incorporated with other additives within a range not to spoil the object of the present invention.

Examples of the additives are a processing stabilizer, a heat stabilizer, an antioxidant, a photo-stabilizer, an ultraviolet light absorber, a metal inactivation agent, a metal soap, a nucleation agent, an antistatic agent, a slipping agent, an antiblocking agent, a lubricant, a flame-retardant, a mold-releasing agent, a mildew-proof agent, a colorant, an antifogging agent, a natural oil, a synthetic oil, wax, an organic filler, an inorganic filler and an epoxy compound.

Especially, a heat stabilizer, an ultraviolet light absorber, a mold releasing agent, a colorant, etc., are generally used among the above additives, and two or more of these additives may be used in combination.

The processing stabilizer, heat stabilizer, antioxidant, etc., to be used in the present invention are, for example, a phosphorus compound, a phenolic stabilizer, an organic thioether stabilizer and a hindered amine stabilizer.

Conventional ultraviolet light absorbers are used as the photo-stabilizer, ultraviolet light absorber, etc., and the examples of the absorbers are a salicylic acid-type ultraviolet light absorber, a benzophenone-type ultraviolet light absorber, a benzotriazole-type ultraviolet light absorber and a cyanoacrylate-type ultraviolet light absorber.

Generally known mold-releasing agents can be used as the mold-releasing agent and the examples of the agents are a hydrocarbon-based mold-releasing agent such as a paraffin, a fatty acid-based mold-releasing agent such as stearic acid, a fatty acid amide-based mold-releasing agent such as stearamide, an alcohol-based mold-releasing agent such as stearyl alcohol and pentaerythritol, a fatty acid ester-based mold-releasing agent such as glycerol monostearate and a silicone-based mold-releasing agent such as a silicone oil.

Organic or inorganic pigments or dyes can be used as the colorant.

The metal inactivation agent is e.g. N,N'-[3-(3,5-di-t-butyl-4-hydroxyphenyl)propionyl]hydraz ine and the metal soap is e.g. calcium stearate and nickel stearate.

Examples of the antistatic agent are quaternary ammonium salts such as (β-lauramidopropyl)trimethylammonium methylsulfate and alkylphosphate compounds.

The nucleation agent is e.g. sorbitol compound or phosphate compound such as sodium di(4-t-butylphenyl) phosphonate, dibenzylidene sorbitol and methylenebis(2,4-di-t-butylphenol) acid phosphate sodium salt.

The lubricant is e.g. erucamide and stearic acid monoglyceride and the flame-retardant is e.g. a halogen-containing phosphoric acid ester such as tris(2-chloroethyl) phosphate, a halide such as hexabromocyclododecane and decabromophenyl oxide, an inorganic metallic compound such as antimony trioxide, antimony pentoxide and aluminum oxide, and their mixture.

These other additives mentioned above are added and kneaded to a molten aromatic polycarbonate resin directly or in a state dissolved or dispersed in a proper solvent or in the form of master pellet. There is no particular restriction to the kind of apparatus for the addition and kneading operation, however, the preferable apparatuses are a twin-screw extruder, etc., and, in the case of adding a catalyst deactivation agent or other additives in a form dissolved or dispersed in a solvent, the use of a vent-type twin-screw extruder is especially preferable.

These other additives are preferably added to a molten aromatic polycarbonate resin together with or separately from the catalyst deactivation agent.

The desired molded article in the present invention generally has the form of pellet, chip, film, sheet, etc., however, there is not restriction to the form as far as the aromatic polycarbonate resin of the present invention is concerned. A product having a desired form can be produced directly from a highly viscous substance without the step of cooling and solidifying of the highly viscous substance followed by remelting.

EXAMPLES

Examples of the present invention are described below. These Examples are solely for the illustration of the present invention and the present invention is not restricted by these Examples. The terms "%" and "parts" in the Examples are "% by weight" and "parts by weight" respectively, unless otherwise stated. In the following Examples, the physical properties of the reaction mixture and the obtained aromatic polycarbonate resin, the average flow velocity of the reaction mixture in a pipe and the average retention time in the pipe were measured by the following methods.

[Intrinsic Viscosity and Viscosity-Average Molecular Weight]

Intrinsic viscosity was measured on 0.7 g/dl methylene chloride solution with a Ubbellohde viscometer, and the viscosity-average molecular weight was calculated by the following formula.

$$[\eta]=1.23\times10^{-4}M^{0.83}$$

[Color (b-value)]

The Lab value of a polycarbonate pellet (minor axis× major axis×length (mm)=2.5×3.3×3.0) was measured by reflection method using ND-1001DP (product of Nippon Denshoku Co., Ltd.) and the b-value was used as the measure of yellowness.

[Flow Velocity of Reaction Mixture in Pipe]

The flow velocity (that is the average flow velocity) was calculated by dividing the quantity of flow in the pipe by the sectional area of the pipe calculated on the inner diameter.

[Average Retention Time of Reaction Mixture in Pipe]

The average retention time was calculated by dividing the volume in the pipe by the flow quantity of the reaction mixture. The sum of the average retention times is the sum of the values on individual pipes.

[Foreign Matter Content]

The foreign matter content was measured by dissolving 1 kg of polycarbonate pellets in 5 liters of methylene chloride, filtering the solution with a filter having a mesh size of 30 μm and counting the number of foreign matter particles collected by the filter.

[Gel Content]

Gel content was measured by dissolving 1 kg of a polymer in 10 kg of methylene chloride, filtering the solution with a filter having a mesh size of 20 μm and observing the filter with a microscope under the illumination with ultraviolet rays.

The following facilities (also called "standard facilities") were used in the Examples unless otherwise stated.

The melt polycondensation reaction was continuously carried out by using a polymerization facility provided with, as auxiliary facilities, a raw material preparation tank to heat and melt an aromatic dihydroxy compound and a carbonic acid diester which were separately measured and charged into the tank, a raw material supplying tank provided with a raw material pump capable of receiving the raw material prepared in the raw material preparation tank and continuously supplying the raw material at a constant rate to the first prepolymerization tank, a catalyst preparation tank for measuring and charging of a polymerization catalyst and phenol for dissolving the catalyst, and a catalyst supplying tank provided with a catalyst pump capable of receiving the catalyst solution prepared in the catalyst preparation tank and supplying the catalyst solution at a constant rate to the first prepolymerization tank.

The prepolymerization tanks were vertical stirring tanks made of SUS316L and composed of two tanks connected in series. Each tank was provided with an inner coil and a jacket.

Each of these two prepolymerization tanks (the first tank and the second tank) was provided with a rectifying column having a refluxing mechanism to separate the monohydroxy compound produced by the reaction and the carbonic acid diester used as a raw material.

The reaction mixture in the first tank was continuously supplied to the second tank with a gear pump placed on a cold-drawn pipe having an inner diameter of 20 mm, made of SUS316L to connect the first tank and the second tank.

The length of the pipe connecting the first and the second tanks was 4 m excluding the part of the gear pump.

The pipe connecting the first and the second tanks was provided with a nozzle for sampling and a jacket to heat or cool the pipe from outside, and the inner surface of the pipe was finished with #400 buff.

The quantity of liquid supplied from the first tank was controlled by interlocking the indication of the level gauge of the first tank with the rotational speed of a gear pump placed on the outlet-side pipe of the first tank.

The reaction mixture in the second tank was continuously supplied to a postpolymerization tank with a gear pump placed on a cold-drawn pipe having an inner diameter of 20 mm, made of SUS316L to connect the second tank and the postpolymerization tank.

The length of the pipe connecting the second and the postpolymerization tanks was 4 m excluding the part of the gear pump.

The pipe connecting the second and the postpolymerization tanks was provided with a nozzle for sampling and a jacket to heat or cool the pipe from outside, and the inner surface of the pipe was finished with #400 buff.

The quantity of liquid supplied from the second tank was controlled by interlocking the indication of the level gauge of the second tank with the rotational speed of a gear pump placed on the outlet-side pipe of the second tank.

The postpolymerization tank was a single-shaft horizontal stirring tank without a rectifying column and having a jacket covering the whole surface of the facility.

The quantity of liquid supplied from the postpolymerization tank was controlled by interlocking the indication of the level gauge of the postpolymerization tank with the rotational speed of a gear pump placed on a cold-drawn pipe having an inner diameter of 20 mm, made of SUS316L to connect the postpolymerization tank and a twin-screw extruder.

The length of the pipe connecting the postpolymerization tank and the twin-screw extruder was 4 m.

The pipe connecting the postpolymerization tank and the twin-screw extruder was provided with a nozzle for sampling and a jacket to heat or cool the pipe from outside, and the inner surface of the pipe was finished with #400 buff.

The aromatic polycarbonate resin discharged from the postpolymerization tank was supplied to the twin-screw extruder with a gear pump, mixed with a catalyst deactivation agent to be subjected to deactivation treatment. The catalyst deactivation agent was prepared in a catalyst deactivation agent preparation tank capable of measuring/receiving separately, stirring and mixing the catalyst deactivation agent and liquid for dispersing the catalyst deactivation agent, then continuously supplied to the twin-screw extruder at a constant rate using a deactivation agent supplying pump capable of continuously supplying the dispersion of the catalyst deactivation agent at a constant rate.

The aromatic polycarbonate resin subjected to the catalyst deactivation treatment was then continuously extruded through a die, forming strands in a cooling bath followed by pelletizing with a cutter.

EXAMPLE 1

The melt polycondensation of an aromatic polycarbonate resin was carried out by using the above reaction facilities (standard facilities).

The operation conditions of the melt polycondensation were as follows.

Bisphenol A was used as the aromatic dihydroxy compound and diphenyl carbonate was used as the carbonic acid diester. Diphenyl carbonate was charged in an amount of 500 kg (2.33 kmol) into a raw material melting tank (a raw material preparation tank) and melted, and 527.6 kg (2.31 kmol) of bisphenol A was charged into the tank and melted under stirring. The raw material mixture prepared by the above process was transferred to a raw material supplying tank.

Bisphenol A disodium salt was used as the polymerization catalyst. The catalyst was dissolved in a phenol/water mixture having a phenol/water weight ratio of 90/10 in a catalyst preparation tank to make a catalyst at the concentration of 30 ppm. The catalyst solution prepared by the above process was transferred to a catalyst supplying tank.

The continuous melt polycondensation was performed by controlling the flow amounts of the raw material supplying pump and a catalyst solution supplying pump to attain the raw material supplying quantity to the first tank of 50 kg/hr and the catalyst solution supplying quantity to the first tank of 0.29 kg/hr.

The operation conditions of each polymerization tank were, an inner temperature of 230° C. and a vacuum degree of 100 Torr for the first tank, an inner temperature of 260° C. and a vacuum degree of 15 Torr for the second tank and the heating medium temperature of 270° C. in the outer jacket and a vacuum degree of 0.5 Torr for the postpolymerization tank.

The heating medium temperature in the jacket of the pipe through which the molten reaction mixture passes was set to be higher than the reaction mixture temperature in the pipe. The temperature difference in each pipe is shown in the Table 1.

The facilities were continuously operated for 600 hours using the above-mentioned apparatuses and operation conditions, and the flow quantities of the reaction mixtures were measured and samples were taken out at the outlets of the first tank, the second tank, the postpolymerization tank and the twin-screw extruder at the end of the operation for 200 hours, 400 hours and 600 hours.

The Tables 2, 3 and 4 show the evaluation results of samples collected after the operations for 200 hours, 400 hours and 600 hours, respectively. The average flow velocity and the average retention time of the reaction mixture in each pipe in the present Example are also described in the Tables 2 to 4.

EXAMPLE 2

Continuous melt polycondensation was carried out by using the same facilities as those of Example 1 and controlling the flow quantities of the raw material supplying pump and the catalyst solution supplying pump to supply 12.5 kg/hr of the raw material and 0.0725 kg/hr of the catalyst solution to the first tank. The facilities were continuously operated for 600 hours under the same operation conditions as those of Example 1, and the flow quantities of the reaction mixtures were measured and samples were taken out at the outlets of the first tank, the second tank, the postpolymerization tank and the twin-screw extruder at the end of the operations for 200 hours, 400 hours and 600 hours.

The temperatures of the reaction mixture in a pipe and the heating medium in the jacket of the pipe through which the molten reaction mixture was passing were set in the same manner as Example 1.

The Tables 2, 3 and 4 show the evaluation results of samples collected after the operations for 200 hours, 400 hours and 600 hours, respectively. The average flow velocity and the average retention time of the reaction mixture in each pipe in the present Example are also described in the Tables 2 to 4.

EXAMPLE 3

In the facilities of Example 1, the length of the pipe between the first tank and the second tank was changed from 4 m to 12 m, the length of the pipe between the second tank and the postpolymerization tank was changed from 4 m to 12 m, and the length of the pipe between the postpolymerization tank and the twin-screw extruder was changed from 4 m to 12 m. Continuous operation was performed for 600 hours controlling the flow quantities of the raw material supplying pump and the catalyst solution supplying pump to supply 12.5 kg/hr of the raw material and 0.0725 kg/hr of the catalyst solution to the first tank. The flow quantities of the reaction mixtures were measured and samples were taken out at the outlets of the first tank, the second tank, the postpolymerization tank and the twin-screw extruder at the end of the operations for 200 hours, 400 hours and 600 hours.

The temperatures of the reaction mixture in a pipe and the heating medium in the jacket of the pipe through which the molten reaction mixture was passing were set in the same manner as Example 1.

The Tables 2, 3 and 4 show the evaluation results of samples collected after the operations for 200 hours, 400 hours and 600 hours, respectively. The average flow velocity and the average retention time of the reaction mixture in each pipe in the present Example are also described in the Tables 2 to 4.

EXAMPLE 4

Continuous operation was performed for 600 hours using the same apparatuses and operation conditions as those of Example 3 except for the use of pipes having inner surface finished with #100 buff between each of the polymerization tanks and between the postpolymerization tank and the twin-screw extruder. The flow quantities of the reaction mixtures were measured and samples were taken out at the outlets of the first tank, the second tank, the postpolymerization tank and the twin-screw extruder at the end of the operations for 200 hours, 400 hours and 600 hours.

The temperatures of the reaction mixture in a pipe and the heating medium in the jacket of the pipe through which the molten reaction mixture was passing were set in the same manner as Example 1.

The Tables 2, 3 and 4 show the evaluation results of samples collected after the operations for 200 hours, 400 hours and 600 hours, respectively. The average flow velocity and the average retention time of the reaction mixture in each pipe in the present Example are also described in the Tables 2 to 4.

EXAMPLE 5

Continuous operation was performed for 600 hours using the same apparatuses and operation conditions as those of Example 3 except for the use of pipes made of SUS304 and manufactured by cold-drawing between each of the polymerization tanks and between the postpolymerization tank and the twin-screw extruder of Example 3. The flow quantities of the reaction mixtures were measured and samples were taken out at the outlets of the first tank, the second tank, the postpolymerization tank and the twin-screw extruder at the end of the operations for 200 hours, 400 hours and 600 hours.

The temperatures of the reaction mixture in a pipe and the heating medium in the jacket of the pipe through which the molten reaction mixture was passing were set in the same manner as Example 1.

The Tables 2, 3 and 4 show the evaluation results of samples collected after the operations for 200 hours, 400 hours and 600 hours, respectively. The average flow velocity and the average retention time of the reaction mixture in each pipe in the present Example are also described in the Tables 2 to 4.

COMPARATIVE EXAMPLE 1

Continuous melt polycondensation was performed by using the same apparatuses and operation conditions as those of Example 1 except for the change of the inner diameter of the pipes from 20 mm to 40 mm and the length of the pipes from 4 m to 2 m between each of the polymerization tanks and between the postpolymerization tank and the twin-screw extruder and controlling the flow quantities of the raw material supplying pump and the catalyst solution supplying pump to supply 12.5 kg/hr of the raw material and 0.0725 kg/hr of the catalyst solution to the first tank. The facilities were continuously operated for 600 hours under the same operation conditions as those of Example 1, and the flow quantities of the reaction mixtures were measured and samples were taken out at the outlets of the first tank, the second tank, the postpolymerization tank and the twin-screw extruder at the end of the operations for 200 hours, 400 hours and 600 hours.

The temperatures of the reaction mixture in a pipe and the heating medium in the jacket of the pipe through which the molten reaction mixture was passing were set in the same manner as Example 1.

The Tables 2, 3 and 4 show the evaluation results of samples collected after the operations for 200 hours, 400 hours and 600 hours, respectively. The average flow velocity and the average retention time of the reaction mixture in each pipe in the present Example are also described in the Tables 2 to 4.

COMPARATIVE EXAMPLE 2

Continuous operation was performed for 600 hours under the same operation conditions as those of Example 1 by using the same apparatuses as those of Example 1 except for the change of the inner diameter of the pipes from 20 mm to 50 mm and the length of the pipes from 4 m to 25 m between each of the polymerization tanks and between the postpolymerization tank and the twin-screw extruder. The flow quantities of the reaction mixtures were measured and samples were taken out at the outlets of the first tank, the second tank, the postpolymerization tank and the twin-screw extruder at the end of the operations for 200 hours, 400 hours and 600 hours.

The temperatures of the reaction mixture in a pipe and the heating medium in the jacket of the pipe through which the molten reaction mixture was passing were set in the same manner as Example 1.

The Tables 2, 3 and 4 show the evaluation results of samples collected after the operations for 200 hours, 400 hours and 600 hours, respectively. The average flow velocity and the average retention time of the reaction mixture in each pipe in the present Example are also described in the Tables 2 to 4.

EXAMPLE 6

The melt polycondensation of an aromatic polycarbonate resin was carried out by using the above reaction facilities (standard facilities).

The operation conditions of the melt polycondensation were as follows.

Bisphenol A was used as the aromatic dihydroxy compound and diphenyl carbonate was used as the carbonic acid diester.

Diphenyl carbonate and bisphenol A were supplied to a monomer mixture preparation tank (a raw material preparation tank) at a diphenyl carbonate/bisphenol A molar ratio of 1.01 and the materials were stirred, mixed and dissolved.

Bisphenol A disodium salt was used as the polymerization catalyst. The catalyst was dissolved in a phenol/water mixture having a phenol/water weight ratio of 90/10 in a catalyst preparation tank to make a catalyst at the concentration of 30 ppm.

To the prepolymerization tank was continuously charged were the molten raw material mixture and the catalyst solution at a rate to supply $1.0\mu$ equivalent of the bisphenol A disodium salt based on 1 mol of bisphenol A in the raw material mixture.

The prepolymerization tank was maintained at 250° C. and 30 Torr, and the reaction liquid is continuously transferred to the postpolymerization tank under controlled level.

The postpolymerization tank was operated at 270° C. and 0.5 Torr.

The obtained polymer was continuously supplied to a twin-screw extruder to deactivate the catalyst. Dodecylbenzenesulfonic acid tetrabutylphosphonium salt was used as the catalyst deactivation agent. The catalyst deactivation agent was dispersed in water in a catalyst deactivation agent preparation tank at a catalyst deactivation agent concentration of 300 ppm and continuously supplied at a rate of 2 equivalent based on the bisphenol A disodium salt used as the polymerization catalyst.

The average retention time of the aromatic polycarbonate resin from the outlet of the gear pump located between the postpolymerization tank and the twin-screw extruder to the position where the catalyst deactivation agent was supplied on the twin-screw extruder was 2 minutes.

Continuous melt-polymerization was carried out for 500 hours using the above apparatuses and operation conditions.

Polycarbonate samples were taken out at a frequency of once a day at the outlet of the twin-screw extruder and the qualities were evaluated. The result is shown in the Table 5.

COMPARATIVE EXAMPLE 3

Continuous melt polymerization was performed for 500 hours using the same apparatuses and reaction conditions as those of Example 6 except for the average retention time of the aromatic polycarbonate resin of 2.2 hours between the outlet of the gear pump positioned between the postpolymerization tank and the twin-screw extruder to the position where the catalyst deactivation agent was supplied on the twin-screw extruder.

Polycarbonate samples were taken out at a frequency of once a day at the outlet of the twin-screw extruder and the qualities were evaluated. The result is shown in the Table 5.

EXAMPLE 7

A disk-type filter made of SUS316 and having a retained particle size of 20 $\mu$m and a filtration area of 0.5 m$^2$ was mounted in a filtration vessel having an inner volume of 3.3 L. A polycarbonate resin produced by the melt-polymerization of diphenyl carbonate and bisphenol A using the above standard facilities and having a viscosity-average molecular weight of 15,200 was directly supplied to the filter to be filtered at 270° C. and a flow rate of 1.7 L/min. The treated amount of the polycarbonate resin per unit area of the filter was 216 kg/m$^2$/hr, the V/W ratio was 1.94 min and the W×1,000/A ratio was 10.8 cm/min, wherein V (L) was the inner volume of the filtration vessel and W (L/min) was the flow rate of filtered polymer.

The initial pressure difference was 40 kgf/cm$^2$ under the above conditions. The filtration was further continued until the cumulative volume of filtered polymer reached 50,000 L, and the pressure difference at the end of filtration was 50 kgf/cm$^2$.

The measured value of the gel content of the filtered polymer was 0 to 2 particles/kg throughout the operation period revealing that there was almost no generation of gel.

Only a slight light emission as was caused by Gel was noticed by ultraviolet irradiation at the outer circumference of the disk-type filter by the disassembling and inspection of the inside of the filter after completing the filtration.

EXAMPLE 8

A disk-type filter made of SUS316 and having a filtering precision (also called a retained particle size in this specification) of 5 $\mu$m and a filtration area of 0.5 m$^2$ was mounted in a filtration vessel having an inner volume of 3.3 L, and a polycarbonate resin having a viscosity-average molecular weight of 15,200 was directly supplied to the filter to be filtered at 270° C. and a flow rate of 1.7 L/min, in the same manner as of Example 7. The treated amount of the polycarbonate resin per unit area of the filter was 216 kg/m$^2$/hr, the V/W ratio was 1.94min and the W×1,000/A ratio was 10.8 cm/min, wherein V (L) was the inner volume of the filtration vessel and W (L/min) was the flow rate of filtered polymer. The initial pressure difference was 110 kgf/cm$^2$ under the above conditions. The filtration was further continued until the volume of filtered polymer reaches 50,000 L, and the pressure difference at the end of filtration was 145 kgf/cm$^2$.

The measured value of the gel content of the filtered polymer was 0 to 1 particle/kg throughout the operation period revealing that there was almost no generation of gel.

Gel emitting light by ultraviolet irradiation was almost unnoticeable by the disassembling and inspection of the inside of the filter after completing the filtration.

EXAMPLE 9

A disk-type filter made of SUS316 and having a filtering precision (also called a retained particle size in this specification) of 20 $\mu$m and a filtration area of 0.2 m$^2$ was mounted in a filtration vessel having an inner volume of 2.8 L, and a polycarbonate resin produced by reacting bisphenol A sodium salt with phosgene, having a viscosity-average molecular weight of 15,200 and melted by an extruder was supplied to the filter to be filtered at 270° C. and a flow rate of 1.7 L/min. The treated amount of the polycarbonate resin per unit area of the filter was 540 kg/m$^2$/hr, the V/W ratio was 1.65 min and the W×1,000/A ratiowas 25.2 cm/min, wherein V (L) was the inner volume of the filtration vessel and W (L/min) was the flow rate of filtered polymer. The initial pressure difference was 100 kgf/cm$^2$ under the above conditions. The filtration was further continued until the volume of filtered polymer reaches 50,000 L, and the pressure difference at the end of filtration was 125 kgf/cm$^2$.

The measured value of the gel content of the filtered polymer was 0 to 1 particle/kg throughout the operation period revealing that there was almost no generation of gel. Gel emitting light by ultraviolet irradiation was almost unnoticeable by the disassembling and inspection of the inside of the filter after completing the filtration.

EXAMPLE 10

A disk-type filter made of SUS316 and having a filtering precision (also called a retained particle size in this specification) of 20 $\mu$m and a filtration area of 0.5 m$^2$ was mounted in a filtration vessel having an inner volume of 3.3 L, and a polycarbonate resin having a viscosity-average molecular weight of 15,200 was directly supplied to the filter to be filtered at 270° C. and a flow rate of 4.5 L/min, in the same manner as of Example 7. The treated amount of the polycarbonate resin per unit area of the filter was 572 kg/m$^2$/hr, the V/W ratio was 0.73 min and the W×1,000/A ratio was 28.6 cm/min, wherein V (L) was the inner volume of the filtration vessel and W (L/min) was the flow rate of filtered polymer. The initial pressure difference was 100 kgf/cm$^2$ under the above conditions. The filtration was further continued until the volume of filtered polymer reaches 50,000 L, and the pressure difference at the end of filtration was 125 kgf/cm$^2$.

The measured value of the gel content of the filtered polymer was 0 to 1 particle/kg throughout the operation period revealing that there was almost no generation of gel. Gel emitting light by ultraviolet irradiation was almost unnoticeable by the disassembling and inspection of the inside of the filter after completing the filtration.

COMPARATIVE EXAMPLE 4

A disk-type filter made of SUS316 and having a filtering precision (also called a retained particle size in this specification) of 20 $\mu$m and a filtration area of 1.4 m$^2$ was mounted in a filtration vessel having an inner volume of 4.9 L, and a polycarbonate resin having a viscosity-average molecular weight of 15,200 was supplied to the filter to be filtered at 270° C. and a flow rate of 0.75 L/min, in the same manner as Example 7. The treated amount of the polycarbonate resin per unit area of the filter was 68.7 kg/m$^2$/hr, the V/W ratio was 6.53 min and the W×1,000/A ratio was 1.67 cm/min, wherein V (L) was the inner volume of the filtration vessel and W (L/min) was the flow rate of filtered polymer. The initial pressure difference was 10 kgf/cm² under the above conditions. The filtration was further continued until the volume of filtered polymer reaches 50,000 L, and the pressure difference at the end of filtration was 12 kgf/cm².

The measured value of the gel content of the filtered polymer was 1 to 4 particles/kg throughout the operation period revealing that there was generation of gel. Gel emitting light by ultraviolet irradiation was noticeable over about ⅕ of the outer circumference of the disk-type filter by the disassembling and inspection of the inside of the filter after completing the filtration.

EXAMPLE 11

A polycarbonate produced under the same condition as Example 6 except for the change of the inner diameter of the pipes from 20 mm to 40 mm between each of the polymerization tanks and between the postpolymerization tank and the twin-screw extruder was directly sent continuously to be filtered under the filtration condition of Example 7 without cooling and solidifying the molten polymer and at the flow rate of 1.7 L/min. The average flow velocities of the reaction mixture in the pipes between 1st and 2nd tanks, between 2nd tank and postpolymerization tank, and between postpolymerization tank and twin-screw extruder are respectively 2.8, 2.7 and 2.7 cm/sec. The average retention times of the reaction mixture in the pipes between 1st and 2nd tanks, between 2nd tank and postpolymerization tank, and between postpolymerization tank and twin-screw extruder are respectively 2.4, 2.7 and 2.7 min. The heating medium temperature in the jacket of the pipe through which the molten reaction mixture passes was set to be higher than the reaction mixture temperature in the pipe by 5–6° C.

The measured value of the gel content of the filtered polymer was 0 to 2 particles/kg throughout the operation period revealing that there was almost no generation of gel. Good Col. b of 0.3–0.5 was kept throughout the operation period.

Only a slight light emission as was caused by Gel was noticed by ultraviolet irradiation at the outer circumference of the disk-type filter by the disassembling and inspection of the inside of the filter after completing the filtration.

EXAMPLE 12

The filtered polycarbonate produced by Example 11 was processed into the form of a sheet directly without the steps of cooling and solidifying the polymer.

The number of defects originated from foreign matters was 2/m² on an average by visual inspection, revealing that the polymer had good quality.

TABLE 1

|  | between 1st and 2nd tanks | between 2nd tank and postpolymerization tank | between postpolymerization tank and twin-screw extruder |
|---|---|---|---|
| Temperature difference (° C.) | 8 | 8 | 9 |

TABLE 2

Evaluation results of samples reaction mixture after lapse of 200 hrs

| No. | sampling position (outlet of) | flow quantity kg/hr | molecular weight | average flow velocity in pipe* cm/sec | average retention time in pipe* min | L/a/b | foreign matter No./kg |
|---|---|---|---|---|---|---|---|
| Example 1 | 1st rank | 33.7 | 1,500 | 2.95 | 2.3 | | |
|  | 2nd tank | 29.2 | 5,500 | 2.56 | 2.6 | | |
|  | postpolymerization tank | 29.1 | 15,200 | 2.55 | 2.6 | 68/−1.3/0.2 | 8 |
| Example 2 | 1st tank | 8.4 | 1,600 | 0.73 | 9.1 | | |
|  | 2nd tank | 7.3 | 5,600 | 0.64 | 10.4 | | |
|  | postpolymerization tank | 7.3 | 15,300 | 0.64 | 10.4 | 68/−1.3/0.3 | 10 |
| Example 3 | 1st tank | 8.4 | 1,700 | 0.73 | 27.4 | | |
|  | 2nd tank | 7.3 | 5,600 | 0.64 | 31.3 | | |
|  | postpolymerization tank | 7.3 | 15,200 | 0.64 | 31.3 | 68/−1.6/0.2 | 13 |
| Example 4 | 1st tank | 8.4 | 1,500 | 0.73 | 27.4 | | |
|  | 2nd tank | 7.3 | 5,500 | 0.64 | 31.3 | | |
|  | postpolymerization tank | 7.3 | 15,300 | 0.64 | 30.5 | 68/−1.1/0.4 | 12 |
| Example 5 | 1st tank | 8.4 | 1,500 | 0.73 | 27.4 | | |
|  | 2nd tank | 7.3 | 5,600 | 0.64 | 31.3 | | |
|  | postpolymerization tank | 7.3 | 15,300 | 0.64 | 30.5 | 68/−1.6/0.3 | 14 |
| Comparative Example 1 | 1st tank | 8.4 | 1,600 | 0.19 | 17.5 | | |
|  | 2nd tank | 7.3 | 5,600 | 0.16 | 20.8 | | |
|  | postpolymerization tank | 7.3 | 15,300 | 0.16 | 20.8 | 68/−1.6/1.9 | ≧100 |
| Comparative Example 2 | 1st tank | 33.6 | 1,500 | 0.48 | 86.8 | | |
|  | 2nd tank | 29.2 | 5,500 | 0.41 | 101.6 | | |
|  | postpolymerization tank | 29.1 | 15,200 | 0.41 | 101.6 | 68/−1.3/2.1 | ≧100 |

*Each between 1st and 2nd tanks, between 2nd tank and postpolymerzation tank, and between postpolymerization and twin-screw extruder.

TABLE 3

Evaluation results of samples reaction mixture after lapse of 400 hrs

| No. | sampling position (outlet of) | flow quantity kg/hr | molecular weight | average flow velocity in pipe* cm/sec | average retention time in pipe* min | L/a/b | foreign matter No./kg |
|---|---|---|---|---|---|---|---|
| Example 1 | 1st tank | 33.7 | 1,500 | 2.95 | 2.3 | | |
| | 2nd tank | 29.2 | 5,500 | 2.56 | 2.6 | | |
| | postpolymerization tank | 29.1 | 15,200 | 2.55 | 2.6 | 68/−1.3/0.2 | 8 |
| Example 2 | 1st tank | 8.4 | 1,600 | 0.73 | 9.1 | | |
| | 2nd tank | 7.3 | 5,600 | 0.64 | 10.4 | | |
| | postpolymerization tank | 7.3 | 15,300 | 0.64 | 10.4 | 68/−1.3/0.3 | 10 |
| Example 3 | 1st tank | 8.4 | 1,700 | 0.73 | 27.4 | | |
| | 2nd tank | 7.3 | 5,600 | 0.64 | 31.3 | | |
| | postpolymerization tank | 7.3 | 15,200 | 0.64 | 31.3 | 68/−1.6/0.2 | 11 |
| Example 4 | 1st tank | 8.4 | 1,500 | 0.73 | 27.4 | | |
| | 2nd tank | 7.3 | 5,500 | 0.64 | 31.3 | | |
| | postpolymerization tank | 7.3 | 15,300 | 0.64 | 30.5 | 68/−1.1/0.4 | 12 |
| Example 5 | 1st tank | 8.4 | 1,500 | 0.73 | 27.4 | | |
| | 2nd tank | 7.3 | 5,600 | 0.64 | 31.3 | | |
| | postpolymerization tank | 7.3 | 15,300 | 0.64 | 30.5 | 68/−1.6/0.3 | 13 |
| Comparative Example 1 | 1st tank | 8.4 | 1,600 | 0.19 | 17.5 | | |
| | 2nd tank | 7.3 | 5,600 | 0.16 | 20.8 | | |
| | postpolymerization tank | 7.3 | 15,300 | 0.16 | 20.8 | 68/−1.6/1.9 | ≧100 |
| Comparative Example 2 | 1st tank | 33.6 | 1,500 | 0.48 | 86.8 | | |
| | 2nd tank | 29.2 | 5,500 | 0.41 | 101.6 | | |
| | postpolymerization tank | 29.1 | 15,200 | 0.41 | 101.6 | 68/−1.3/2.1 | ≧100 |

*Each between 1st and 2nd tanks, between 2nd tank and postpolymerzation tank, and between postpolymerization and twin-screw extruder.

TABLE 4

Evaluation results of samples reaction mixture after lapse of 600 hrs

| No. | sampling position (outlet of) | flow quantity kg/hr | molecular weight | average flow velocity in pipe* cm/sec | average retention time in pipe* min | L/a/b | foreign matter No./kg |
|---|---|---|---|---|---|---|---|
| Example 1 | 1st tank | 33.7 | 1,500 | 2.95 | 2.3 | | |
| | 2nd tank | 29.2 | 5,500 | 2.56 | 2.6 | | |
| | postpolymerization tank | 29.1 | 15,200 | 2.55 | 2.6 | 68/−1.3/0.2 | 9 |
| Example 2 | 1st tank | 8.4 | 1,600 | 0.73 | 9.1 | | |
| | 2nd tank | 7.3 | 5,600 | 0.64 | 10.4 | | |
| | postpolymerization tank | 7.3 | 15,300 | 0.64 | 10.4 | 68/−1.3/0.3 | 10 |
| Example 3 | 1st tank | 8.4 | 1,700 | 0.73 | 27.4 | | |
| | 2nd tank | 7.3 | 5,600 | 0.64 | 31.3 | | |
| | postpolymerization tank | 7.3 | 15,200 | 0.64 | 31.3 | 68/−1.6/0.2 | 12 |
| Example 4 | 1st tank | 8.4 | 1,500 | 0.73 | 27.4 | | |
| | 2nd tank | 7.3 | 5,500 | 0.64 | 31.3 | | |
| | postpolymerization tank | 7.3 | 15,300 | 0.64 | 30.5 | 68/−1.1/0.4 | 12 |
| Example 5 | 1st tank | 8.4 | 1,500 | 0.73 | 27.4 | | |
| | 2nd tank | 7.3 | 5,600 | 0.64 | 31.3 | | |
| | postpolymerization tank | 7.3 | 15,300 | 0.64 | 30.5 | 68/−1.6/0.3 | 15 |
| Comparative Example 1 | 1st tank | 8.4 | 1,600 | 0.19 | 17.5 | | |
| | 2nd tank | 7.3 | 5,600 | 0.16 | 20.8 | | |
| | postpolymerization tank | 7.3 | 15,300 | 0.16 | 20.8 | 68/−1.6/1.9 | ≧100 |
| Comparative | 1st tank | 33.6 | 1,500 | 0.48 | 86.8 | | |

TABLE 4-continued

Evaluation results of samples reaction mixture after lapse of 600 hrs

| No. | sampling position (outlet of) | flow quantity kg/hr | molecular weight | average flow velocity in pipe* cm/sec | average retention time in pipe* min | L/a/b | foreign matter No./kg |
|---|---|---|---|---|---|---|---|
| Example 2 | 2nd tank | 29.2 | 5,500 | 0.41 | 101.6 | | |
| | postpolymerization tank | 29.1 | 15,200 | 0.41 | 101.6 | 68/−1.3/2.1 | ≧100 |

*Each between 1st and 2nd tanks, between 2nd tank and postpolymerization tank, and between postpolymerzation and twin-screw extruder.

TABLE 5

| | Color (b-value) |
|---|---|
| Example 6 | 0.2 to 0.4 |
| Comparative Example 3 | 1.8 to 2.6 |

EXAMPLE 13

30 disk type filter elements made from SUS316 and having a retained particle size of 20 μm, an inner diameter/outer diameter ratio of 1/4.8 and an outer diameter of 12 inches (30.5 cm) were piled up together at a lamination interval of 1.5 mm and set in a filter unit having a total capacity of 27 liters, and a polycarbonate having a viscosity average molecular weight of 15,200 obtained by melt polymerizing diphenyl carbonate and bisphenol A was supplied directly from a polymerizer into the filter unit at a flow rate of 17 liters/min at 270° C. to be filtered. The amount of the polycarbonate filtered per the filtration unit area of the disk type filter element was 263 kg/m$^2$/hr, the ratio (V/W) of the volume V (L) of the filtration vessel to the flow rate W (L/min) of the filtered polymer was 1.6 min, and W×1000/A was 172 cm/min. Under the conditions, the initial pressure difference was 40 kgf/cm$^2$. When filtration was continued for 20 days under the above conditions, the pressure difference at the end of filtration was 50 kgf/cm$^2$.

1 kg of the polymer obtained by filtration was dissolved in 10 kg of methylene chloride to prepare a solution which was then filtered by a filter having a retained particle size of 20 μm, and the filter was observed through a microscope under exposure to ultraviolet radiation to measure the content of a gel. As a result, the number of gels formed was stable at 0 to 2 per kg throughout the operation period.

When the filtration operation was terminated and the inside of the filter unit was inspected by disassembly, a gel which emitted light by ultraviolet radiation was slightly observed in the outer circumferential portion of the disk type filter element.

EXAMPLE 14

30 disk type filter elements made from SUS316 and having a retained particle size of 20 μm, an inner diameter/outer diameter ratio of 1/4 and an outer diameter of 12 inches (30.5 cm) were piled up together at a lamination interval of 1.5 mm and set in a filter unit having a total capacity of 27 liters, and a polycarbonate having a viscosity average molecular weight of 15,200 obtained by melt polymerizing diphenyl carbonate and bisphenol A was supplied directly from a polymerizer into the filter unit at a flow rate of 17 liters/min at 270° C. to be filtered. The amount of the polycarbonate filtered per the filtration unit area of the disk type filter element was 268 kg/m$^2$/hr, the ratio (V/W) of the volume V (L) of the filtration vessel to the flow rate W (L/min) of the filtered polymer was 1.6 min, and W×1000/A was 172 cm/min. Under the conditions, the initial pressure difference was 42 kgf/cm$^2$. When filtration was continued for 20 days under the above conditions, the pressure difference at the end of filtration was 53 kgf/cm$^2$.

1kg of the polymer obtained by filtration was dissolved in 10 kg of methylene chloride to prepare a solution which was then filtered by a filter having a retained particle size of 20 μm, and the filter was observed through a microscope under exposure to ultraviolet radiation to measure the content of a gel. As a result, the number of gels formed was stable at 0 to 1 per kg throughout the operation period.

When the filtration operation was terminated and the inside of the filter unit was inspected by disassembly, a gel which emitted light by ultraviolet radiation was not observed in the outer circumferential portion of the disk type filter element.

EXAMPLE 15

30 disk type filter elements made from SUS316 and having a retained particle size of 20 μm, an inner diameter/outer diameter ratio of 1/6 and an outer diameter of 12 inches (30.5 cm) were piled up together at a lamination interval of 1.5 mm and set in a filter unit having a total capacity of 27 liters, and a polycarbonate having a viscosity average molecular weight of 15,200 obtained by melt polymerizing diphenyl carbonate and bisphenol A was supplied directly from a polymerizer into the filter unit at a flow rate of 17 liters/min at 270° C. to be filtered. The amount of the polycarbonate filtered per the filtration unit area of the disk type filter element was 259 kg/m$^2$/hr, the ratio (V/W) of the volume V (L) of the filtration vessel to the flow rate W (L/min) of the filtered polymer was 1.6 min, and W×1000/A was 172 cm/min. Under the conditions, the initial pressure difference was 38 kgf/cm$^2$. When filtration was continued for 20 days under the above conditions, the pressure difference at the end of filtration was 48 kgf/cm$^2$.

1 kg of the polymer obtained by filtration was dissolved in 10 kg of methylene chloride to prepare a solution which was then filtered by a filter having a retained particle size of 20 μm, and the filter was observed through a microscope under exposure to ultraviolet radiation to measure the content of a gel. As a result, the number of gels formed was stable at 10 or less per kg throughout the operation period.

When the filtration operation was terminated and the inside of the filter unit was inspected by disassembly, a trace amount of a gel which emitted light by ultraviolet radiation was observed in the outer circumferential portion of the disk type filter element.

EXAMPLE 16

30 disk type filter elements made from SUS316 and having a retained particle size of 40 μm, an inner diameter/outer diameter ratio of 1/2.7 and an outer diameter of 8 inches (20.3 cm) were piled up together at a lamination interval of 1.9 mm and set in a filter unit having a total capacity of 14 liters, and a polycarbonate having a viscosity average molecular weight of 24,000 obtained by melt polymerizing diphenyl carbonate and bisphenol A was supplied directly from a polymerizer into the filter unit at a flow rate of 13 liters/min at 310° C. to be filtered. The amount of the polycarbonate filtered per the filtration unit area of the disk type filter element was 504 kg/m$^2$/hr, the ratio (V/W) of the volume V (L) of the filtration vessel to the flow rate W (L/min) of the filtered polymer was 1.1 min, and W×1000/A was 178 cm/min. Under the conditions, the initial pressure difference was 90 kgf/cm. When filtration was continued for 20 days under the above conditions, the pressure difference at the end of filtration was 110 kgf/cm$^2$.

1 kg of the polymer obtained by filtration was dissolved in 10 kg of methylene chloride to prepare a solution which was then filtered by a filter having a retained particle size of 20 μm, and the filter was observed through a microscope under exposure to ultraviolet radiation to measure the content of a gel. As a result, the number of gels formed was stable at 5 or less per kg throughout the operation period.

When the filtration operation was terminated and the inside of the filter unit was inspected by disassembly, a gel which emitted light by ultraviolet radiation was rarely observed in the outer circumferential portion of the disk type filter element.

EXAMPLE 17

30 disk type filter elements made from SUS316 and having a retained particle size of 40 μm, an inner diameter/outer diameter ratio of 1/6 and an outer diameter of 12 inches (30.5 cm) were piled up together at a lamination interval of 1.9 mm and set in a filter unit having a total capacity of 27 liters, and a polycarbonate having a viscosity average molecular weight of 24,000 obtained by melt polymerizing diphenyl carbonate and bisphenol A was supplied directly from a polymerizer into the filter unit at a flow rate of 13 liters/min at 310° C. to be filtered. The amount of the polycarbonate filtered per the filtration unit area of the disk type filter element was 198 kg/m$^2$/hr, the ratio (V/W) of the volume V (L) of the filtration vessel to the flow rate W (L/min) of the filtered polymer was 2.1 min, and W×1000/A was 131 cm/min. Under the conditions, the initial pressure difference was 60 kgf/cm$^2$. When filtration was continued for 20 days under the above conditions, the pressure difference at the end of filtration was 65 kgf/cm$^2$.

1kg of the polymer obtained by filtration was dissolved in 10 kg of methylene chloride to prepare a solution which was then filtered by a filter having a retained particle size of 20 μm, and the filter was observed through a microscope under exposure to ultraviolet radiation to measure the content of a gel. As a result, the number of gels formed was stable at 20 or less per kg throughout the operation period.

When the filtration operation was terminated and the inside of the filter unit was inspected by disassembly, a gel which emitted light by ultraviolet radiation was observed in the outer circumferential portion of the disk type filter element but the obtained polycarbonate was satisfactory as a whole.

What is claimed is:

1. A process for the production of an aromatic polycarbonate resin comprising filtering an aromatic polycarbonate resin having a viscosity-average molecular weight of 10,000 or more in a molten state with a filter having a retained particle size of 40 μm or less under a pressure difference of 20 kg/cm$^2$ or more.

2. The process for the production of an aromatic polycarbonate resin according to claim 1, wherein the filter having a retained particle size of 40 μm or less is a filter having a retained particle size of 20 μm or less.

3. A process for the production of an aromatic polycarbonate resin comprising filtering an aromatic polycarbonate resin having a viscosity-average molecular weight of 10,000 or more in a molten state with a filter having a retained particle size of 10 μm or less under a pressure difference of 40 kg/cm$^2$ or more.

4. The process for the production of an aromatic polycarbonate resin according to any one of claims 1 to 3, wherein a quantity of the aromatic polycarbonate resin to be treated is 50 kg/m$^2$/hr or more based on a unit area of the filter.

5. The process for the production of an aromatic polycarbonate resin according to any one of the above claims 1 to 3, wherein a ratio V/W of volume V (L) in a filtration vessel to flow rate W (L/min) of the filtered polymer is within a range of 0.2 to 10 min.

6. The process for the production of an aromatic polycarbonate resin according to any one of claims 1 to 3, wherein a maximum area A (cm$^2$) of a polymer flow path in a filtration vessel and a flow rate W satisfy the requirement that a value W×1,000/A is from 1 cm/min to 10,000 cm/min.

7. The process for the production according to any one of claims 1 to 3, wherein the aromatic polycarbonate resin is an aromatic polycarbonate resin produced by polycondensation of an aromatic diol compound and a carbonic acid diester compound in the presence or absence of a catalyst.

8. The process for the production according to any one of claims 1 to 3, wherein the aromatic polycarbonate resin produced by the polycondensation of an aromatic diol compound and a carbonic acid diester compound in the presence or absence of a catalyst is, after the addition of an additive as required, directly filtered with a filter in molten state without cooling and solidifying the resin.

9. A process for the production of an aromatic polycarbonate resin wherein a flow velocity of a reaction mixture in a pipe through which a molten reaction mixture passes is 0.5 cm/sec or more in a production of an aromatic polycarbonate resin by continuous melt polycondensation of a mixture containing an aromatic dihydroxy compound and an aromatic carbonic acid diester as main components in the presence of a catalyst.

10. A process for the production of an aromatic polycarbonate resin wherein a flow velocity of a reaction mixture in a pipe through which a molten reaction mixture passes is 2 cm/sec or more in a production of an aromatic polycarbonate resin by continuous melt polycondensation of a mixture containing an aromatic dihydroxy compound and an aromatic carbonic acid diester as main components in the presence of a catalyst.

11. The process for the production of an aromatic polycarbonate resin according to claim 9 or 10, wherein a viscosity-average molecular weight of the reaction mixture in a pipe through which the molten reaction mixture passes is 1,000 or more.

12. The process for the production of an aromatic polycarbonate resin according to claim 9 or 10, wherein a viscosity-average molecular weight of the reaction mixture in a pipe through which the molten reaction mixture passes is 9,000 or more.

13. The process for the production of an aromatic polycarbonate resin according to claim 9 or 10, wherein a sum of average retention times of the reaction mixture in pipes through which the molten reaction mixture passes is not longer than 3 hours.

14. The process for the production of an aromatic polycarbonate resin according to claim 9 or 10, wherein a wall surface temperature of a pipe through which the molten reaction mixture passes is set to be higher than a temperature of the reaction mixture in the pipe.

15. The process for the production of an aromatic polycarbonate resin according to claim 9 or 10, wherein the pipe through which the molten reaction mixture passes is a cold-drawn stainless steel pipe.

16. The process for the production of an aromatic polycarbonate resin according to claim 9 or 10, wherein the pipe through which the molten reaction mixture passes is a stainless steel pipe having a buff-finished inner surface.

17. The process for the production of an aromatic polycarbonate resin according to claim 8, wherein a catalyst deactivation agent is added to a system within 2 hours after completion of the melt polycondensation reaction in the production of an aromatic polycarbonate resin by the melt polycondensation of mixture containing an aromatic dihydroxy compound and an aromatic carbonic acid diester as main components in the presence of a catalyst.

18. The process for the production of an aromatic polycarbonate resin according to claim 8, wherein the flow velocity of a reaction mixture in a pipe through which the molten reaction mixture passes is 0.5 cm/sec or more in the production of an aromatic polycarbonate resin by the continuous melt polycondensation of a mixture containing an aromatic dihydroxy compound and an aromatic carbonic acid diester as main components in the presence of a catalyst.

19. The process for the production of an aromatic polycarbonate resin described in claim 17, wherein the flow velocity of a reaction mixture in a pipe through which the molten reaction mixture passes is 0.5 cm/sec or more in the production of an aromatic polycarbonate resin by the continuous melt polycondensation of a mixture containing an aromatic dihydroxy compound and an aromatic carbonic acid diester as main components in the presence of a catalyst.

20. A molded article of an aromatic polycarbonate resin produced by directly processing an aromatic polycarbonate resin obtained by the method of claim 8 into a desired product form without cooling and solidifying the produced resin.

21. A molded article of an aromatic polycarbonate resin produced by directly processing an aromatic polycarbonate resin obtained by the method according to claim 17 into a desired product form without cooling and solidifying the produced resin.

22. A molded article of an aromatic polycarbonate resin produced by directly processing an aromatic polycarbonate resin obtained by the method according to claim 18 into a desired product form without cooling and solidifying the produced resin.

23. A molded article of an aromatic polycarbonate resin produced by directly processing an aromatic polycarbonate resin obtained by a method according to claim 19 into a desired product form without cooling and solidifying the produced resin.

24. The process for the production of an aromatic polycarbonate resin according to claim 8, wherein the viscosity-average molecular weight of the reaction mixture in a pipe through which the molten reaction mixture passes is 10,000 or more.

25. The process for the production of an aromatic polycarbonate resin according to claim 8, wherein a wall surface temperature of a pipe through which the molten reaction mixture passes is set to be higher than the temperature of the reaction mixture in the pipe.

26. The process for the production of an aromatic polycarbonate resin described in claim 17, wherein the viscosity-average molecular weight of the reaction mixture in a pipe through which the molten reaction mixture passes is 10,000 or more.

27. The process for the production of an aromatic polycarbonate resin according to claim 17, wherein a wall surface temperature of a pipe through which the molten reaction mixture passes is set to be higher than the temperature of the reaction mixture in the pipe.

28. A molded article of an aromatic polycarbonate resin produced by directly processing an aromatic polycarbonate resin obtained by the method according to claim 24 into a desired product form without cooling and solidifying the produced resin.

29. A molded article of an aromatic polycarbonate resin produced by directly processing an aromatic polycarbonate resin obtained by the method according to claim 25 into a desired product form without cooling and solidifying the produced resin.

30. A molded article of an aromatic polycarbonate resin produced by directly processing an aromatic polycarbonate resin obtained by the method according to claim 26 into a desired product form without cooling and solidifying the produced resin.

31. A molded article of an aromatic polycarbonate resin produced by directly processing an aromatic polycarbonate resin obtained by the method according to claim 27 into a desired product form without cooling and solidifying the produced resin.

32. A process for the production of an aromatic polycarbonate resin comprising filtering an aromatic polycarbonate resin having a viscosity average molecular weight of 10,000 or more in a molten state with (1) a filter unit constructed by piling up a plurality of disk type filter elements having an outer diameter of 4 to 15 inches, an inner diameter/outer diameter ratio of 1/7 or more and a retained particle size of 40 βm or less under (2) a pressure difference of 20 kg/cm$^2$ or more.

33. The process for the production of an aromatic polycarbonate resin according to claim 32, wherein the disk type filter elements have a retained particle size of 20 βm or less.

34. The process for the production of an aromatic polycarbonate resin according to claim 32, wherein the disk type filter elements have a retained particle size of 10 βm or less and the pressure difference is 40 kg/cm$^2$ or more.

35. The process for the production of an aromatic polycarbonate resin according to claim 32, wherein the quantity of the aromatic polycarbonate resin to be treated is 50 kg/m$^2$/hr or more based on the unit area of the filter unit.

36. The process for the production of an aromatic polycarbonate resin according to claim 32, wherein the disk type filter elements have an inner diameter/outer diameter ratio of 1/5 or more.

37. The process for the production of an aromatic polycarbonate resin according to claim 32, wherein the disk type filter elements have an outer diameter of 6 to 12 inches.

38. The process for the production of an aromatic polycarbonate resin according to claim 32, wherein the filter unit is constructed by piling up together 5 to 500 disk type filter elements.

39. The process for the production of an aromatic polycarbonate resin according to claim 32, wherein the lamination interval between adjacent disk type filter elements of the filter unit is 5 mm or less.

40. The process for the production of an aromatic polycarbonate resin according to claim 32, wherein one filter unit is installed in one filtration vessel.

41. The process for the production of an aromatic polycarbonate resin according to claim 40, wherein the ratio (V/W) of the volume V (L) of the filtration vessel to the flow rate W (L/min) of the resin in the vessel is in the range of 0.2 to 10 min.

\* \* \* \* \*

UNITED STATES PATENT AND TRADEMARK OFFICE
CERTIFICATE OF CORRECTION

PATENT NO.    : 6,472,496 B2
DATED         : October 29, 2002
INVENTOR(S)   : Kyosuke Matsumoto et al.

It is certified that error appears in the above-identified patent and that said Letters Patent is hereby corrected as shown below:

<u>Title page,</u>
Item [30], Foreign Application Priority Data, delete "Oct. 27, 1998" and insert -- Oct. 29, 1998 --.

Signed and Sealed this

Eleventh Day of February, 2003

JAMES E. ROGAN
*Director of the United States Patent and Trademark Office*